US008611622B2

(12) United States Patent
Vincent et al.

(10) Patent No.: US 8,611,622 B2
(45) Date of Patent: Dec. 17, 2013

(54) METHOD FOR DETERMINING AN ESTIMATION OF A TOPOLOGICAL SUPPORT OF A TUBULAR STRUCTURE AND USE THEREOF IN VIRTUAL ENDOSCOPY

(75) Inventors: Thomas Bernard Pascal Vincent, Montreal (CA); Florent Andre Robert Chandelier, Montreal (CA)

(73) Assignee: Dog Microsystems Inc., Granby, Quebec (CA)

( * ) Notice: Subject to any disclaimer, the term of this patent is extended or adjusted under 35 U.S.C. 154(b) by 0 days.

(21) Appl. No.: 13/375,114

(22) PCT Filed: Nov. 27, 2009

(86) PCT No.: PCT/CA2009/001749
§ 371 (c)(1),
(2), (4) Date: Jan. 30, 2012

(87) PCT Pub. No.: WO2011/063495
PCT Pub. Date: Jun. 3, 2011

(65) Prior Publication Data
US 2012/0128219 A1    May 24, 2012

(51) Int. Cl.
*G06K 9/00* (2006.01)
*G06K 9/34* (2006.01)

(52) U.S. Cl.
USPC .......................................... 382/128; 382/173

(58) Field of Classification Search
USPC .................. 382/128, 173, 180, 204
See application file for complete search history.

(56) References Cited

U.S. PATENT DOCUMENTS

| 7,031,517 | B1 * | 4/2006 | Le et al. ........................ 382/173 |
| 2001/0031920 | A1 | 10/2001 | Kaufman et al. |
| 2007/0058865 | A1 * | 3/2007 | Li et al. ........................ 382/173 |
| 2007/0248250 | A1 | 10/2007 | Gulsun et al. |
| 2008/0008367 | A1 * | 1/2008 | Franaszek et al. ............ 382/128 |
| 2008/0187202 | A1 | 8/2008 | Qian et al. |
| 2010/0296709 | A1 * | 11/2010 | Ostrovsky-Berman et al. .............................. 382/128 |
| 2011/0013837 | A1 * | 1/2011 | Bergman et al. .............. 382/173 |

OTHER PUBLICATIONS

International Search Report for International Application No. PCT/CA2009/001749 mailed Aug. 26, 2010.

* cited by examiner

*Primary Examiner* — Jon Chang
(74) *Attorney, Agent, or Firm* — Pearl Cohen Zedek Latzer Baratz, LLP

(57) ABSTRACT

A method for determining an estimation of a topological support of a tubular based structure comprising an inner wall and a plurality of distinct regions, the method comprising (a) obtaining image data representative of the tubular based structure; (b) placing an initial seed in an initial region selected from one of the distinct regions; (c) performing an initial region growing until an initial resulting area comprises at least a portion of the inner wall and at least a portion of a neighboring region corresponding to one of the distinct regions; (d) starting a tree comprising an initial tree node corresponding to the initial region; (e) for each neighboring region: placing a subsequent seed in the neighboring region; performing a corresponding subsequent region growing until a subsequent resulting area comprises at least a portion of the inner wall and at least a portion of an additional neighboring region; and adding a tree node corresponding to the neighboring region in the tree; (f) performing processing step (e) for each of the additional neighboring regions; and (g) filtering the tree according to predetermined topological parameters to thereby determine the estimation of the topological support of the tubular based structure. Applications of the method for estimating a colon topology for virtual colonoscopy are also disclosed.

33 Claims, 12 Drawing Sheets

METHOD FOR DETERMINING AN ESTIMATION OF A TOPOLOGICAL SUPPORT OF A TUBULAR STRUCTURE AND USE THEREOF IN VIRTUAL ENDOSCOPY

CROSS-REFERENCE TO RELATED APPLICATIONS

This application is a National Phase Application of PCT International Application No. PCT/CA2009/001749, entitled "METHOD AND SYSTEM FOR DETERMINING AN ESTIMATION OF A TOPOLOGICAL SUPPORT OF A TUBULAR STRUCTURE AND USE THEREOF IN VIRTUAL ENDOSCOPY", International Filing Date Nov. 27, 2009, published on Jun. 3, 2011 as International Publication No. WO 2011/063495, which is incorporated in its entirety herein by reference.

FIELD OF THE INVENTION

The invention generally relates to image processing and more particularly relates to a method and a system for determining an estimation of a topological support of a tubular structure. It also relates to applications of the method for estimating a colon topology in virtual colonoscopy.

BACKGROUND OF THE INVENTION

Conventional endoscopic procedures typically rely on the use of a flexible fiber optic tube which is inserted in the patient's body to visually examine an inner anatomical structure. The operator can then manipulate the tube inside the anatomical structure to search for any anatomical abnormalities.

Conventional colonoscopies using this procedure, although reliable, are both costly in money and time. Moreover, it is an invasive, uncomfortable and sometimes painful procedure for the patient.

Non-invasive procedures, also called virtual colonoscopies, have been used to reduce at least one of the above mentioned drawbacks of the invasive colonoscopic procedure.

These non-invasive procedures use imaging techniques such as a computed tomography (CT) scanning to obtain image data representative of the anatomical structure to analyze.

They also involve three typical patient preparation procedures: a full cathartic preparation that aims at completely cleansing the colon by using a laxative solution, a mild-laxative preparation that aims at fluidifying the colon materials and tagging any remnant solid of liquid materials, and finally a laxative-free preparation where the materials inside the colon are tagged by a solution drunk by the patient, such as a barium-based preparation.

Different automatic techniques have been proposed to locate the anatomical structure under analysis such as the colon's inner wall. However, these techniques often have difficulties to correctly locate the surface of the inner wall of the colon, especially near the interfaces between air regions and tagged regions extending therein.

In fact, if an air region-tagged region interface is not correctly identified, it may lead to leakage in the identification and location of the colon's inner wall, which is a great concern. For example, a portion of the small bowel lying proximate to the colon may be segmented and identified as a portion of the colon.

Moreover, a poor colon's inner wall segmentation may lead to over- or under-evaluation of a potential colonic lesion, which is also a great concern.

In order to reduce the above-mentioned drawbacks, dynamical algorithms using local parameters for identifying a corresponding portion of the colon's inner wall have been used.

For example, US patent application published under publication number 2008/0008367, describes a two-step segmentation method performing an initial trial segmentation enabling leakage prior to a subsequent tailored segmentation. This method however requires that the air region-tagged region interfaces be properly detected. In the case wherein an interface is too thick or inhomogeneous, the method may not properly provide a correct identification and/or location of the colon's inner wall.

Moreover, in the case the colon of the patient is collapsed due to a spasm of the patient during the image acquisition and/or the presence of an obstructive tumor, the method may not be capable of providing a correct identification of the entire colon.

It would therefore be desirable to provide an improved method for determining an estimation of a topological support of a tubular structure that will reduce at least one of the above-mentioned drawbacks.

BRIEF SUMMARY

Accordingly, there is disclosed a method for determining an estimation of a topological support of a tubular based structure comprising an inner wall and a plurality of distinct regions, the method comprising (a) obtaining image data representative of the tubular based structure; (b) placing an initial seed in an initial region selected from one of the distinct regions; (c) performing an initial region growing until an initial resulting area comprises at least a portion of the inner wall and at least a portion of a neighboring region corresponding to one of the distinct regions; (d) starting a tree comprising an initial tree node corresponding to the initial region; (e) for each neighboring region: placing a subsequent seed in the neighboring region; performing a corresponding subsequent region growing until a subsequent resulting area comprises at least a portion of the inner wall and at least a portion of an additional neighboring region; and adding a tree node corresponding to the neighboring region in the tree; (f) performing processing step (e) for each of the additional neighboring regions; and (g) filtering the tree according to predetermined topological parameters to thereby determine the estimation of the topological support of the tubular based structure.

The method provides the estimation of the topological support of the tubular based structure without relying on segmentation parameters, which is of great advantage.

The obtained estimation may allow to perform a better subsequent processing, should it be required, which is also of great advantage. Such processing may be a subsequent segmentation for a non-limitative example.

Moreover, the obtained estimation may be used to provide an accurate 3D representation of the tubular based structure based on a volume rendering process, which is of great advantage. Indeed, since no segmentation nor any alteration of the image data is required, the 3D representation accurately shows the 2D information of the image data.

Furthermore, the method may be used to provide an accurate 3D representation of the tubular based structure without depending on predetermined rigorous values of the image data, which is of great advantage. The method may thus be used with a wide variety of image data types and a wide variety of scanning devices.

Moreover, in one embodiment, the method provides the estimation of the topological support of the tubular based structure without having to use the interfaces between the distinct regions, which is also of great advantage.

In one embodiment, the obtaining of the image data comprises receiving the image data from a CT scanning device.

In a further embodiment, the obtaining of the image data comprises receiving the image data from a device selected from the group consisting of a magnetic resonance imaging (MRI) device, a positron emission tomography (PET) device, an X-Rays device, an ultrasound device and any combination thereof.

In one embodiment, the image data are selected from the group consisting of volumetric medical image data, volumetric tomographic image data and a set of parallel successive image planes.

In one embodiment, the image data are representative of an anatomic structure.

In one embodiment, the image data comprises a plurality of unitary image elements selected from the group consisting of pixels and voxels.

In one embodiment, the plurality of distinct regions comprises a plurality of first substance regions and a plurality of second substance regions.

In a further embodiment, the placing of an initial seed comprises selecting the initial region from one of the first substance regions. The performing of an initial region growing further comprises selecting the neighboring region from one of the second substance regions.

In yet a further embodiment, in the performing of a corresponding subsequent region growing, the additional neighboring region is selected such that each of the neighboring region and the additional neighboring region respectively belongs to a corresponding one of the plurality of first substance regions and the plurality of second substance regions.

In one embodiment, the identification of additional neighboring regions is performed by scanning neighboring portion of the image data with a process featuring a field of interest greater than that of the region growing of the initial resulting area.

In one embodiment, the performing of an initial region growing is performed until the initial resulting area further comprises at least a portion of outer surroundings of the inner wall of the tubular based structure.

In one embodiment, the performing of a corresponding subsequent region growing is performed until the subsequent resulting area further comprises at least a part of outer surroundings of the inner wall of the tubular based structure.

In one embodiment, the performing of an initial region growing is performed until the initial resulting area comprises the initial region.

In a further embodiment, the performing of a corresponding subsequent region growing is performed until the subsequent resulting area comprises the neighboring region.

In one embodiment, the performing of the region growing features a sphere of a given diameter enabling the processing of unitary image elements potentially belonging to the region.

In a further embodiment, the identification of potential subsequent regions is done through a region growing featuring a sphere that has a given diameter greater than the sphere diameter involved in the region growing enabling the processing of unitary image elements potentially belonging to a given region.

In yet a further embodiment, the scanning of potential subsequent regions identifies supplementary seeds for subsequent region growings of regions.

In a further embodiment, the identification of supplementary seeds is based on density-based criteria, the number of elements featuring the same density-based criteria or a combination thereof.

In one embodiment, the identification of subsequent supplementary seeds results in the identification of seed elements belonging to already processed regions in which case only the topological information is kept and added to the tree, thereby preventing subsequent region growing for such seeds.

In a further embodiment, the method further comprises, before the performing of an initial region growing, determining a first substance threshold for the first substance regions and a second substance threshold for the second substance regions.

In one embodiment, the method further comprises (i) placing a supplementary initial seed in a supplementary initial region selected from one of the corresponding regions; (ii) performing a supplementary initial region growing until a supplementary initial resulting area comprises at least a portion of the inner wall and at least a portion of a supplementary neighboring region corresponding to one of the distinct regions; (iii) starting a supplementary tree comprising an initial tree node corresponding to the supplementary initial region; (iv) for each supplementary neighboring region: placing a supplementary subsequent seed in the supplementary neighboring region; performing a corresponding supplementary subsequent region growing until a supplementary subsequent resulting area comprises at least a portion of the inner wall and at least a portion of a supplementary additional neighboring region; and adding a tree node corresponding to the supplementary neighboring region in the supplementary tree; (v) performing processing step (iv) for each of the supplementary additional neighboring regions; and (vi) grouping the supplementary tree to the tree.

In one embodiment, the method further comprises, before the placing of an initial seed in an initial region, selecting the initial region.

In a further embodiment, the selecting of the initial region comprises selecting the initial region proximate to an end of the tubular based structure.

In another further embodiment, the method further comprises, before the placing of a supplementary initial seed in a supplementary initial region, selecting the supplementary initial region.

In one embodiment, the selecting of the supplementary initial region comprises selecting the supplementary initial region proximate to a remaining end of the tubular based structure.

In a further embodiment, the method further comprises using a corresponding number of auxiliary seeds for adding corresponding tree nodes to the tree until the tree comprises at least one continuous path between the tree nodes corresponding to each of the initial seed and the supplementary initial seed.

In another further embodiment, the method further comprises using a corresponding number of auxiliary seeds for adding corresponding tree nodes to the tree until the tree comprises a corresponding one tree node for each of the distinct regions.

In one embodiment, the selecting of the initial region is manually performed by an operator.

In another embodiment, the selecting of the initial region is automatically performed.

In one embodiment, the selecting of the supplementary initial region is manually performed by an operator.

In another embodiment, the selecting of the supplementary initial region is automatically performed.

In one embodiment, the image data comprise a plurality of unitary image elements and the method further comprises, for each of the regions corresponding to a corresponding tree node, determining a corresponding classification for each unitary element of the region.

In a further embodiment, the plurality of distinct regions comprises a plurality of first substance regions and a plurality of second substance regions. The determining of a classification comprises assigning a first substance class to each unitary image element of each of the first substance regions corresponding to a corresponding tree node and assigning a second substance class to each unitary image element of each of the second substance regions corresponding to a corresponding tree node.

In a further embodiment, each remaining unitary image element not belonging to any regions but processed during the process of identification of subsequent regions is grouped with the others as potential interface type elements.

In another embodiment, the potential interface type elements are grouped in two groups based on the topological information of the tree, such two groups being non-interface elements and interface type elements, interface type elements being between two consecutive nodes of the tree.

In still a further embodiment, the method further comprises, for each remaining unitary image element not comprised in the corresponding resulting area of each of the region growings: determining at least one proximity parameter according to a distance between the corresponding unitary image element and at least one neighboring region corresponding to a tree node; and determining at least one affiliation parameter defining an affiliation of the corresponding unitary image element to a corresponding class according to the corresponding at least one proximity parameter. The method further comprises determining an interface type between two consecutive nodes of the tree according to the corresponding affiliations of the corresponding unitary image elements neighboring the corresponding regions corresponding to the two consecutive nodes; and determining a refined estimation of the topological support of the tubular based structure according to the determined interface type between two consecutive nodes of the tree.

In yet a further embodiment, the determining of an interface type between two consecutive nodes of the tree is further performed according to at least one additional parameter selected from the group consisting of a density based distribution of the corresponding unitary image elements, a distribution based homogeneity of the corresponding unitary image elements, the topological information of the structure of interest and a morphological parameter of the interface type.

In a further embodiment, an estimated centerline of the tubular based structure is determined according to the refined estimation.

In one embodiment, an estimated centerline of the tubular based structure is determined according to the estimation of the topological support of the tubular based structure.

In one embodiment, the filtering of the tree comprises sequentially linking each of the tree nodes one after the other.

In one embodiment, the tree comprises at least one main path and at least one of a closed loop and an additional branch, the filtering of the tree comprising cancelling from the tree at least one of a portion of the closed loop and the at least one additional branch.

In one embodiment, the cancelling is performed according to a region volume of each of the distinct regions associated to a corresponding node.

In one embodiment, the tubular based structure comprises at least a portion of a colon.

In another embodiment, the tubular based structure comprises at least a portion of a colon and the plurality of distinct regions comprises a plurality of air type regions and a plurality of tagged substance type regions.

In one embodiment, the method further comprises displaying the estimation of the topological support of the tubular based structure to an operator.

In a further embodiment, the displaying comprises masking in the image data surroundings of the tubular based structure.

According to another aspect, there is also disclosed the use of the method for determining an estimation of a topological support of a tubular based structure for estimating a colon topology.

According to another aspect, there is also provided a method and a system for processing interface regions and the subsequent reconstruction of the processed interface region according to the nature or the characteristics of the structure of interest.

In one embodiment, means to process interface regions and subsequent reconstruction of the processed regions according to the nature of the colonic mucosa are provided.

In one embodiment, means to process interface type elements between two consecutive nodes of the tree are provided.

In another embodiment, means to process the interface type elements between an air type region and a tagged type region in virtual colonoscopy are provided.

In yet a further embodiment, the processing of the interface type elements is performed by attributing a value density to every interface type elements that is different than that of typical colonic mucosa elements.

In one embodiment, the processing of the interface type elements is performed by attributing an air density to every interface type elements.

In a further embodiment, prior to the processing of the interface-type elements, the interface-type regions are expanded.

In one embodiment, the expansion of the interface-type regions is performed while maintaining the actual topology of the structure of interest.

In another embodiment, the processing of the interface-type elements is followed by a reconstruction of the processed interface-type region according to the nature or the characteristics of the structure of interest.

In a further embodiment, the reconstruction of the processed interface-type region is performed according to the implicit information of every new elements gathered during the expansion process. By the expression "implicit", it is meant any implied or understood though not directly expressed. For Example, the mucosa is never directly expressed since it is a 3D region comprising unsegmented unitary image element (i.e. a surface region between air and tissue), but implicit characteristics such as normal field of this mucosa may be extracted via the gradient field of the intensity values.

In one embodiment, the reconstruction of the processed region is performed by attributing density values to each of the interface-type elements, considering the implicit information of every elements belonging to every other neighboring regions.

In one embodiment, the reconstruction of the processed region is performed by attributing density values to each of the interface-type elements considering the implicit information of every element of the regions corresponding to the regions surrounding the interface-type regions.

In yet a further embodiment, the attribution of density values to each of the interface-type elements is performed by considering the implicit information of the relative spatial strength obtained from normal vectors determined from the density of the elements of the neighboring regions.

In one embodiment, the implicit information is one or a combination of the gradient vector field, a vector field and a density-based vector field, In one embodiment, the implicit information is one or a combination of a scalar field, a vector field and a tensor field.

According to another aspect, there is also provided a system for determining an estimation of a topological support of a tubular based structure. The system comprises a data receiving unit for receiving the image data representative of the tubular based structure; a placing unit operatively coupled to the data receiving unit for placing each of the seeds in each of the corresponding regions; a processing unit operatively coupled to the placing unit for performing each of the region growings; a tree building unit operatively coupled to the processing unit for building the tree; and a filtering unit operatively coupled to the tree building unit for filtering the tree according to the predetermined topological parameters to thereby determine the estimation of the topological support of the tubular based structure.

In one embodiment, the system further comprises a display unit operatively coupled to the filtering unit for displaying the estimation of the topological support of the tubular based structure.

According to another aspect, there is also provided a machine readable medium having instructions recorded thereon for performing the method for determining an estimation of a topological support of a tubular based structure.

According to another aspect, there is also provided a method of doing business in determining an estimation of a topological support of a tubular based structure according to the method previously described, wherein the estimation of a topological support of a tubular based structure is determined for a fee.

According to another aspect, there is also provided a method of doing business in determining an estimation of a topological support of a tubular based structure, the method comprising receiving the image data; performing the method previously described; and providing the estimation of the topological support of the tubular based structure for a fee.

According to another aspect, there is also provided a method of doing business in determining an estimation of a topological support of a tubular based structure, the method comprising providing by a provider a system for determining an estimation of a topological support of a tubular based structure as previously described to a third party; operating the system, wherein the operating is done by a third party for a fee; and reconveying by the third party at least a portion of the fee to the provider.

The method for determining an estimation of a topological support of a tubular based structure may be used with several types of image data, which is of great advantage.

Moreover, in the case of virtual colonoscopy, the method may provide a suitable estimation of a topological support of a colon, even in the case the colon of the patient is collapsed due to a spasm during the image acquisition and/or the presence of an obstructive tumor for example, which is of great advantage.

Furthermore, in the case of virtual colonoscopy, the method may provide an estimated centerline of the colon in a fast manner, which is of great advantage since a 2D fly-through visualization may be rapidly provided to the operator or the doctor.

The expression "region" means a set of neighboring unitary image elements which are all contiguous to each others in a same pocket. The regions may be in 2D or 3D, depending on the image data used.

The expression "tubular based structure" should be understood as encompassing any hollow elongated structure having at least two ends.

BRIEF DESCRIPTION OF THE DRAWINGS

In order that the invention may be readily understood, embodiments of the invention are illustrated by way of example in the accompanying drawings.

Figure 1:
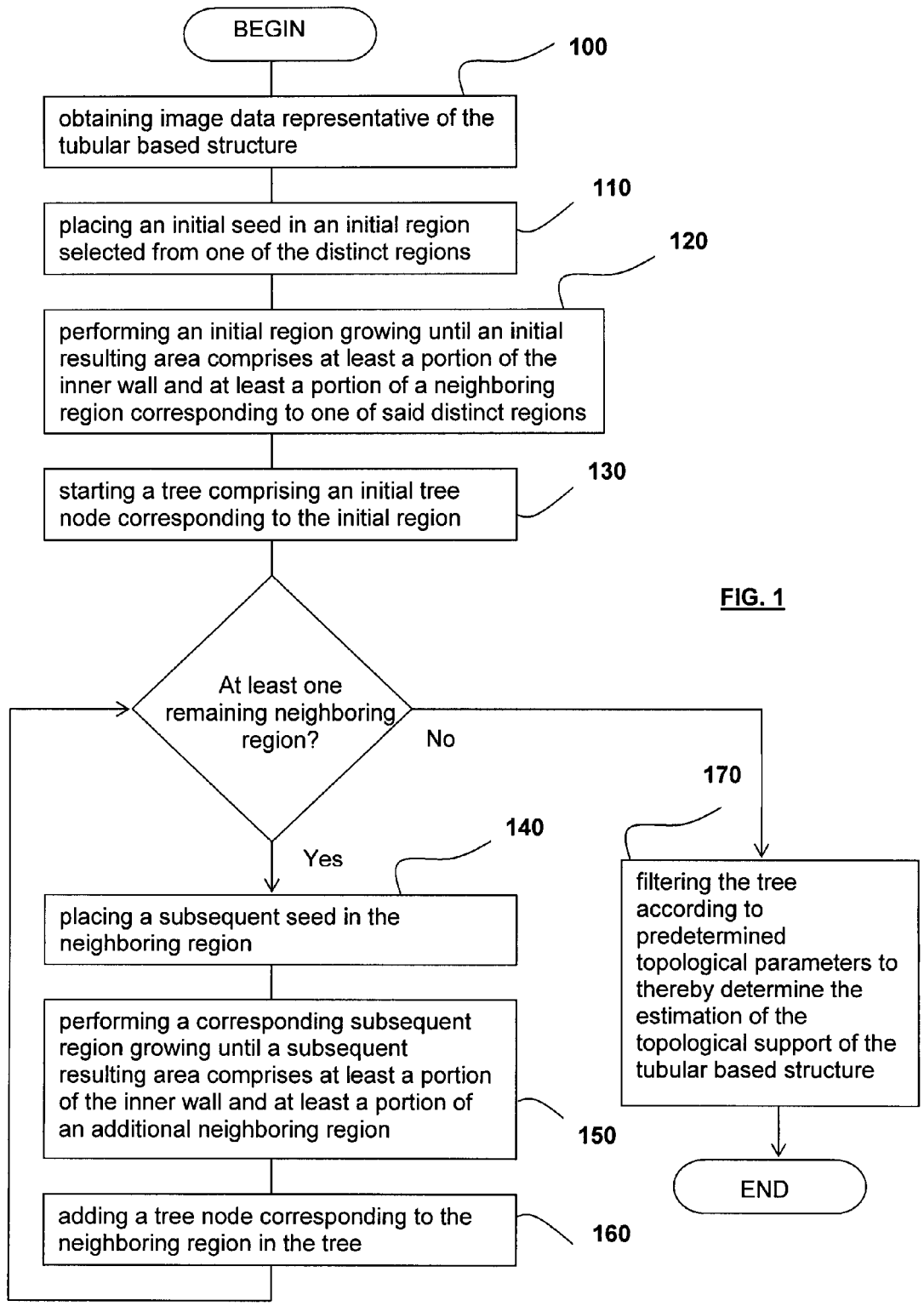
FIG. 1 is a flow chart showing a method for determining an estimation of a topological support of a tubular based structure, according to one embodiment of the invention.

Further details of the invention and its advantages will be apparent from the detailed description included below.

DETAILED DESCRIPTION

In the following description of the embodiments, references to the accompanying drawings are by way of illustration of examples by which the invention may be practiced. It will be understood that various other embodiments may be made and used without departing from the scope of the invention disclosed.

The invention concerns a method and a system for determining an estimation of a topological support of a tubular based structure that may be particularly useful in the field of medical images processing. Throughout the present description, the method will be described for the particular application of estimating a colon topology in virtual colonoscopy but the skilled addressee will appreciate that the method is not limited to this specific application and that many other applications may be considered, as it will become apparent upon reading of the present description. For non-limitative examples, the method may be useful in CT enterography applications, applications for detecting aortic Abdominal Aneurysms, virtual endoscopy applications for the lung and brain aneurysm virtual endoscopy applications.

The skilled addressee will appreciate that the method for determining an estimation of a topological support of a tubular based structure of the invention may be generally useful for facilitating the subsequent examination of an anatomical structure, such as for colorectal cancer screening for instance. The skilled addressee will also appreciate that the method is also suitable for anatomical structures comprising at least two phases, such as the colon structure which comprises an inner wall and a plurality of air regions and marked fecal matter regions extending therein.

The method is particularly advantageous since it is not limited to specific types of image data. Rather, the method may be used on different types of image data sets, as it will become apparent below. Moreover, the method may be implemented without relying on rigorous predetermined values of the image data nor a specific contrast, as it will also become apparent to the skilled addressee.

Indeed, the skilled addressee will appreciate that the system and the method described above are particularly advantageous since they may be used with prepless CT colonoscopy, laxative free CT colonoscopy, mild preparation CT colonoscopy with tagging agent and cathartic preparation with tagging of remnant fluids/stools for CT colonoscopy as non limitative examples.

Prepless CT colonoscopy is described in Comparison of routine and unprepped CT colonography augmented by low fiber diet and stool tagging: a pilot study, Abraham H. Dachman and al., Abdom Imaging (2007) 32:96-104; in CT Colonography without Cathartic Preparation: Feasibility Study, Matthew R. Callstrom, Radiology 2001; 219:693-698 and also in CAD of Colon Cancer on CT Colonography Cases without Cathartic Bowel Preparation, Marius George Linguraru and al., 30th Annual International IEEE EMBS Conference Vancouver, British Columbia, Canada, Aug. 20-24, 2008. Each of these references is incorporated herein by reference.

Laxative free CT colonoscopy is described in Development of a Cathartic-Free Colorectal Cancer Screening Test Using Virtual Colonoscopy: A Feasibility Study, Kristina T. Johnson, AJR:188, January 2007, p 2936; in Dietary Fecal Tagging as a Cleansing Method before CT Colonography: Initial Results—Polyp Detection and Patient Acceptancel, Philippe A. Lefere, Radiology 2002; 224:393-403; and in Noncathartic CT Colonography with Stool Tagging: Performance With and Without Electronic Stool Subtraction, C. Daniel Johnson, AJR:190, February 2008, p 361-366. Each of these references is incorporated herein by reference.

Mild preparation CT colonoscopy with tagging agent is described in Image Quality and Patient Acceptance of Four Regimens with Different Amounts of Mild Laxatives for CT Colonography, Sebastiaan Jensch1 and al., AJR:191, July 2008, p 158-167, which is incorporated herein by reference.

Cathartic preparation with tagging of remnant fluids/stools for CT colonoscopy is described in Efficacy of Barium-Based Fecal Tagging for CT Colonography: a Comparison between the Use of High and Low Density Barium Suspensions in a Korean Population—a Preliminary Study, Min Ju Kim and al., Korean J Radiol 10(1), February 2009, p 25-33; in The Alternative: Faecal Tagging, Philippe Lefere and Stefaan Gryspeerdt, Virtual Colonoscopy, Springer Berlin Heidelberg, 2006, p 35-49; and in Tagging-based, Electronically Cleansed CT Colonography: Evaluation of Patient Comfort and Image Readability, Michael E. Zalis, and al., Radiology: Volume 239: Number 1—April 2006, p 149-159. Each of these references is incorporated herein by reference.

The skilled addressee will appreciate that laxative-free preparations may involve the use of Iodine that may have a potential laxative side-effect but may provide better residual tagging than barium only tagging preparations.

Furthermore, the skilled addressee will appreciate that the disclosed method may enable to provide the estimation of the tubular based structure in a relative fast turn around time, depending on processing resources used.

Typically, state of the art methods take between 5 to 18 minutes per dataset, as mentioned in ACCURATE AND FAST 3D COLON SEGMENTATION IN CT COLONOGRAPHY, Dongqing Chen, Rachid Fahmi, Aly A. Farag, Robert L. Falk, and Gerald W. Dryden, ISBI 2009 p 490-493, and for a single CT scan of 512×512×440 on a Pentium IV 2.6 GHz PC, where the present method would performed a topological definition of the structure of interest within 3 to 5 minutes for a complete colorectal cancer screening study, that is two datasets of comparable dimension and ready for visual 3D examination through volume rendering. Thus, the present method may be at least twice as fast as current state-of-the-art methods.

Figure 5A:
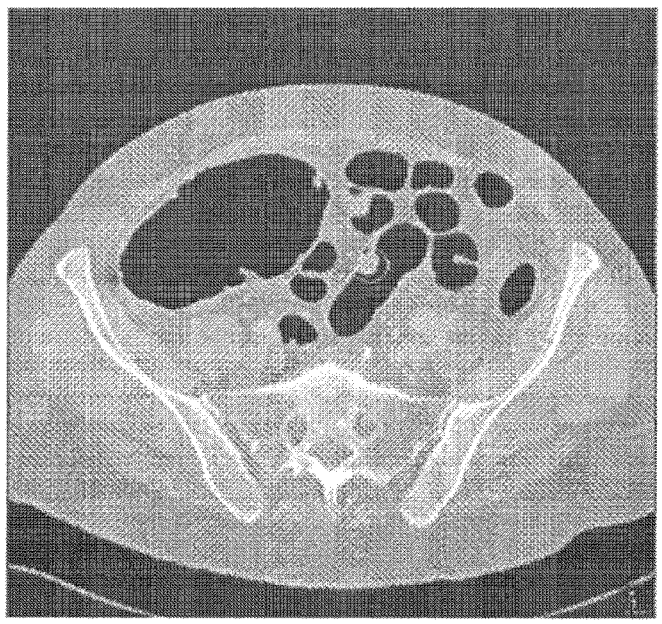
FIG. 5A shows a portion of image data representative of a colon.
Figure 5B:
FIG. 5B shows a 3D representation of a portion of the image data of FIG. 5A.
Figure 5C:
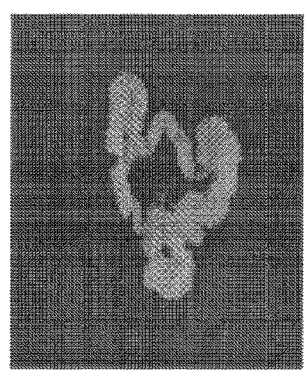
FIG. 5C is a 3D representation of a colon of a patient.

FIGS. 5A to 5C shows an example of an image 500 of an image data set representative of a tubular based structure, a colon in the illustrated case, and an estimated colon topology 502.

Figure 7B:
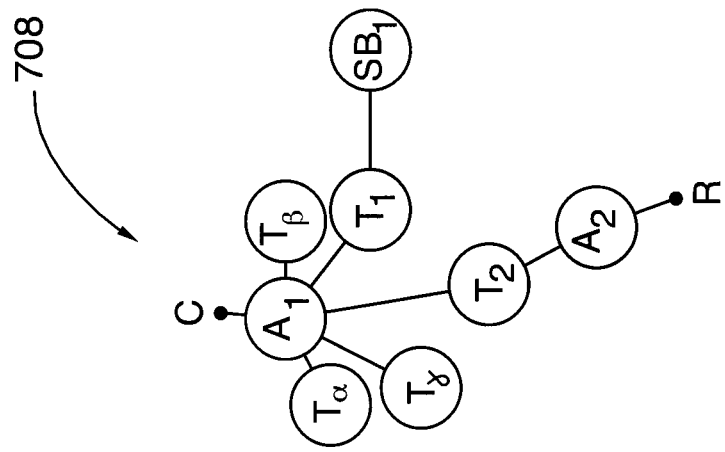
FIG. 7B is a schematic illustrating a tree corresponding to the tubular based structure shown in FIG. 7A.
Figure 7A:
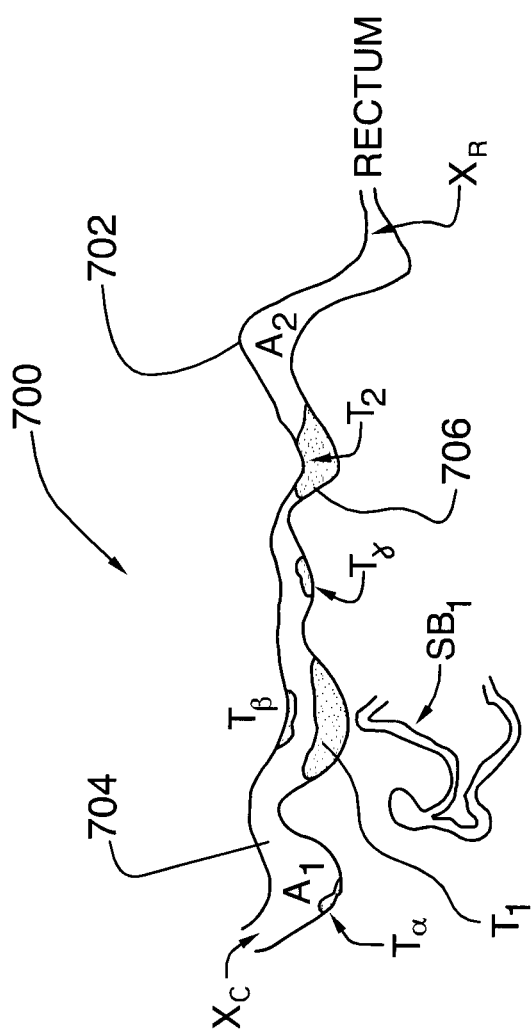
FIG. 7A is a schematic illustrating an embodiment of a tubular based structure.

FIG. 7A shows an example of a tubular based structure 700 comprising an inner wall 702 and a plurality of distinct regions. In the case wherein the tubular based structure 700 comprises a colon or at least a portion of a colon, the inner wall 702 may comprise the mucosa of the colon as well as soft and fat tissues. In the illustrated case, the plurality of distinct regions comprises a plurality of first substance regions 704, also referred to as the air type regions, and a plurality of second substance regions 706, also referred to as the tagged substance type regions, which correspond to the tagged fecal matter regions.

Throughout the present description, the expression "region" means a set of neighboring unitary image elements which are all contiguous to each others in a same pocket. The regions may be in 2D or 3D, depending on the image data used.

Referring to FIG. 1, there is shown a flow chart of a method for determining an estimation of a topological support of a tubular based structure, according to one embodiment.

As it will become apparent upon reading of the present description, the method for determining an estimation of a topological support of a tubular based structure relies on given steps for building a tree representative of the tubular structure; the tree comprising successive nodes representative of the succession of air regions and tagged substance regions extending in the tubular based structure.

An embodiment of the method will now be described with reference to FIGS. 1, 7A and 7B.

According to processing step 100, image data representative of the tubular based structure are provided. The image data may comprise, as non-limitative examples, a volumetric medical image, a volumetric tomographic image and/or a plurality of parallel successive image planes, as well known in the art.

In one embodiment, the processing step 100 comprises receiving the image data from a CT scanning device. In another embodiment, the image data may be received from a magnetic resonance imaging (MRI) device. Alternatively, the image data may be received from a positron emission tomography (PET) device, an X-Rays device, an ultrasound device or any combination of such devices. In another embodiment, the image data may be retrieved from a database or may even be retrieved from a readable medium such as a compact disk or a picture archiving and communication system (PACS) for instance.

In one embodiment, the image data comprise a plurality of unitary image elements, such as pixels or voxels for instance. The skilled addressee will nevertheless appreciate that the expression "unitary image elements" should not be limited to pixels and voxels but should rather be understood as encompassing any homogenous element, point or dot of an image or display surface, geometrical element, mesh of a network, face of a mesh or vertex to which an intensity, a color or another parameter may be associated individually to the others.

Still referring to FIG. 1, according to processing step 110, an initial seed is placed in an initial region selected from one of the distinct regions.

In the exemplary embodiment shown in FIG. 7A, the initial seed Xc is placed in the initial region A1.

In a preferred embodiment, before the initial seed is placed in an initial region, the initial region is first selected. In one embodiment, the selection of the initial region is manually performed by an operator. Alternatively, in another embodiment, the selection of the initial region is automatically performed. The skilled addressee will appreciate that the automatic selection of the initial region may be performed according to various parameters, such as described in Iordanescu G, Pickhardt P J, Choi J R, Summers R M, Automated seed placement for colon segmentation in computed tomography colonography, Acad Radiol. 2005 February; 12(2):182-90 for example.

In a preferred embodiment, the initial region is selected proximate to an end of the tubular based structure, as it will become apparent below. In the exemplary embodiment shown in FIG. 7A, the initial region which is selected extends proximate to the caecum of the colon.

Still referring to FIG. 1, according to processing step 120, an initial region growing is performed until an initial resulting area comprises at least a portion of the inner wall and at least a portion of a neighboring region corresponding to one of the distinct regions.

In a preferred embodiment, the initial region is selected from one of the first substance regions while the neighboring region is selected from one of the second substance regions. In other words, as it will be more detailed thereinafter, the regions that are considered are alternatively selected from one of the two types of regions.

In a preferred embodiment, the initial region growing is performed until the initial resulting area further comprises at least a portion of outer surroundings of the inner wall of the tubular based structure. In other words, the initial region is selected and then, the immediate neighboring thereof is also selected until the resulting area also comprises a portion of the outer surroundings of the inner wall of the tubular based structure.

The skilled addressee will appreciate that the outer surroundings of the inner wall of the tubular based structure, in the case the tubular based structure comprises a colon or a portion thereof, may comprise soft and fat tissues, muscles, bones or portions of other adjacent structures, such as a portion of the small bowel for example.

In a further preferred embodiment, the initial region growing is performed until the initial resulting area comprises the entire initial region.

The skilled addressee will appreciate that, in prior art applications of region growing, the unitary image elements of a same region are grouped according to an iterative process based on their homogeneity, to thereby segment the selected portion of the image data into distinct zones of interest. In these prior art applications, the region growing is used to extract one particular region from the others.

For example, in US patent application published under number US 2002/0193687 and entitled Automatic analysis in virtual endoscopy, the region growing is explained as follows: the region of interest is segmented using a three-dimensional region growing technique and an initial static threshold value. The threshold value chosen should approach the maximum threshold value which can be selected without having the segmentation procedure fail by including surrounding structures as part of the region of interest.

The skilled addressee will understand upon reading of the present description that in the present application, the region growings are not used for purpose of segmenting an image into distinct zones of interest in order to extract a particular region. Rather, the region growings are used to select a part of an image surrounding a corresponding seed. As previously described, the resulting area obtained from the regions growing should comprise portions of several types of region.

The skilled addressee will also appreciate that the selecting of an immediate neighboring may be performed on volumetric image data. Thus, it should be understood that the resulting area may be a three dimensional volume obtained on a plurality of consecutive two dimensional images.

Still referring to FIG. 1, according to processing step 130, a tree 708 comprising an initial tree node corresponding to the initial region is started.

In the exemplary embodiment shown in FIGS. 7A and 7B, the tree is started with the initial tree node A1.

Still referring to FIG. 1 and as more detailed below, processing steps 140, 150 and 160 are performed for each of the neighboring regions found in processing step 120.

Indeed, according to processing step 140, a subsequent seed is placed in the neighboring region previously found.

According to processing step 150, a corresponding subsequent region growing is performed until a subsequent resulting area comprises at least a portion of the inner wall and at least a portion of an additional neighboring region.

In a preferred embodiment, in processing step 150, the additional neighboring region is selected such that each of the neighboring region and the additional neighboring region respectively belongs to a corresponding one of the plurality of first substance regions and the plurality of second substance regions. In other words and as previously mentioned, the regions considered are alternatively selected from a corresponding type thereof.

In a preferred embodiment, the corresponding subsequent region growing is performed until the subsequent resulting area further comprises at least a portion of outer surroundings of the inner wall of the tubular based structure.

In a further preferred embodiment, the corresponding subsequent region growing is performed until the subsequent resulting area comprises the whole neighboring region.

Figure 10:
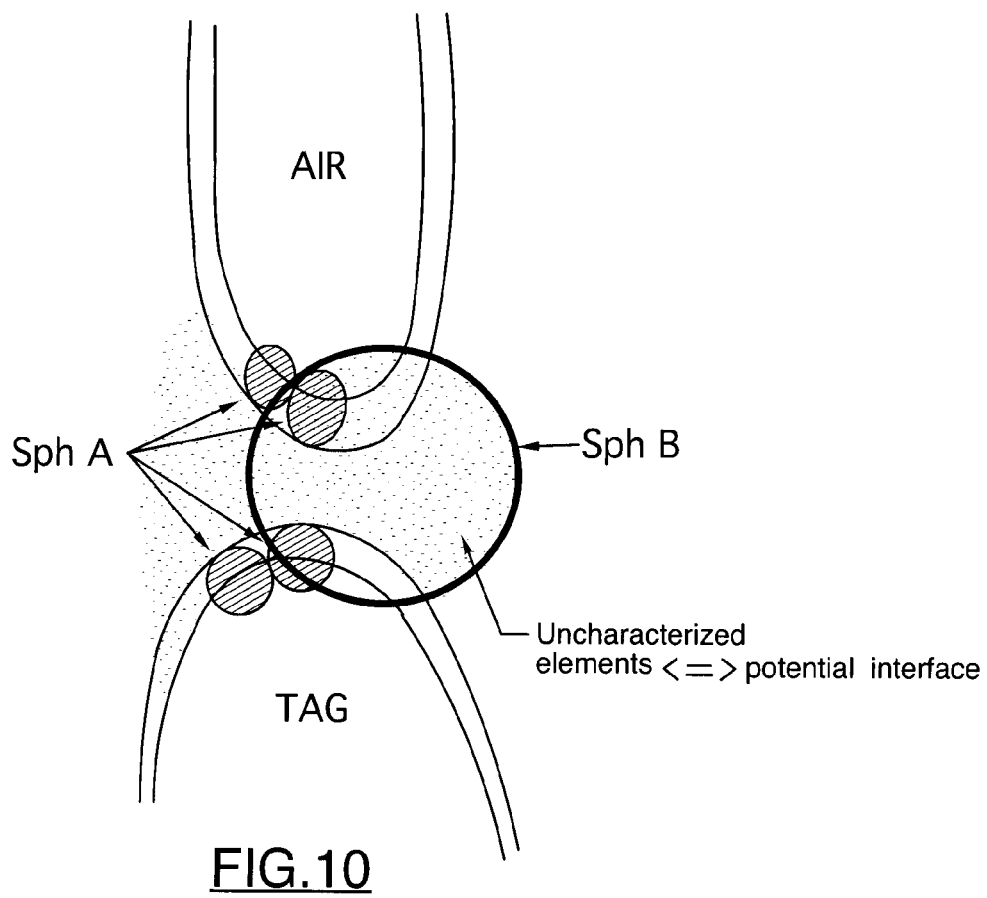
FIG. 10 illustrates how the identification of additional neighboring regions is performed, according to one embodiment.
Figure 11:
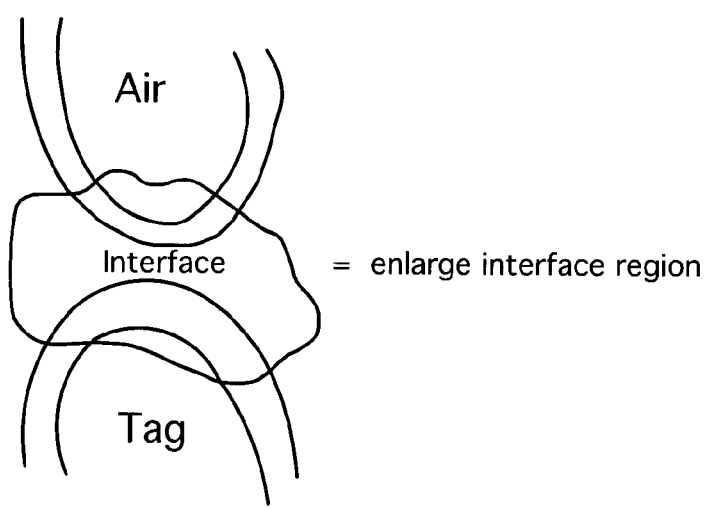
FIGS. 11 to 15 illustrate the reconstruction of the mucosa of the colon, according to an embodiment.
Figure 12:
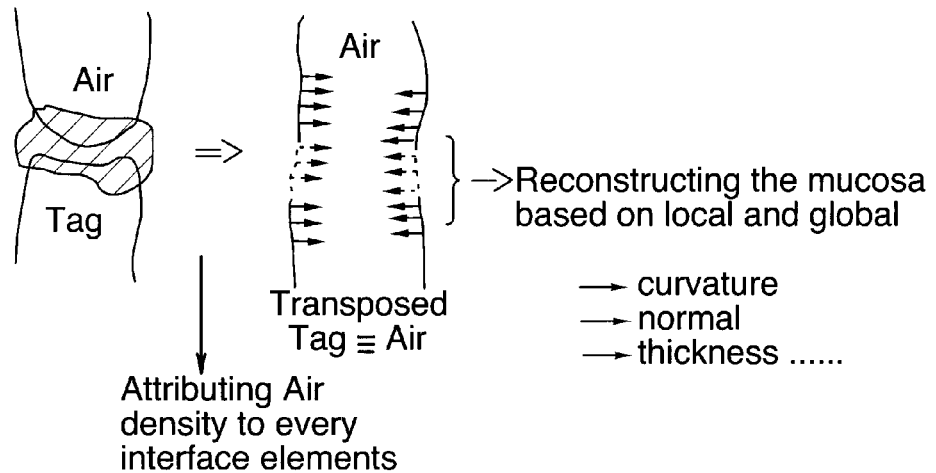
Figure 13:
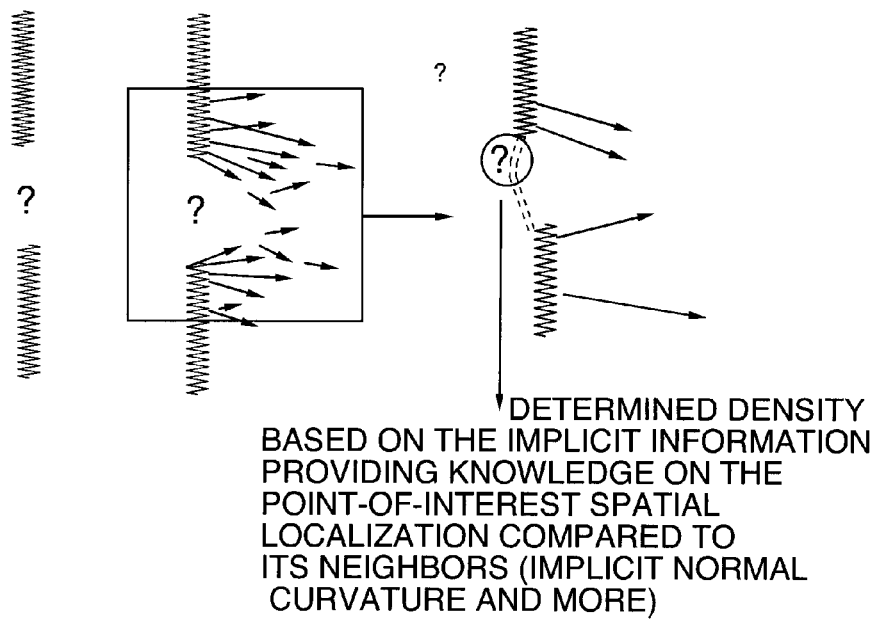
Figure 14:
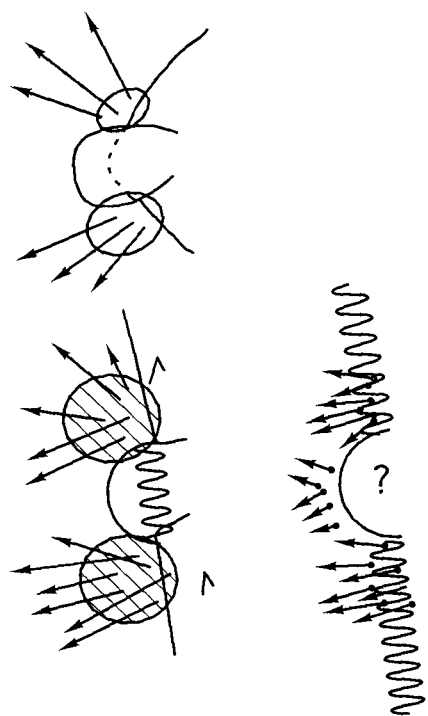

In one embodiment and as shown in FIG. 10, the identification of additional neighboring regions may be performed by scanning neighboring portion of the image data with a process featuring a field of interest greater than that of the region growing of the initial resulting area. The skilled addressee will appreciate that a region growing or a raycast process may be used.

According to processing step 160, a tree node corresponding to the neighboring region is added to the tree.

Still referring to FIG. 1, processing steps 140, 150, and 160 are performed for each of the additional neighboring regions found in processing step 150.

In one embodiment and as shown in FIG. 10, the performing of the region growing features a sphere of a given diameter enabling the processing of unitary image elements potentially belonging to the region.

In a further embodiment, the identification of potential subsequent regions is done through a region growing featuring a sphere that has a given diameter greater than the sphere diameter involved in the region growing enabling the processing of unitary image elements potentially belonging to a given region.

In yet a further embodiment, the scanning of potential subsequent regions identifies supplementary seeds for subsequent region growings of regions.

In a further embodiment, the identification of supplementary seeds is based on density-based criteria, the number of elements featuring the same density-based criteria or a combination thereof, which is of great advantage since it may prevent consideration of an artifact element.

In one embodiment, the identification of subsequent supplementary seeds results in the identification of seed elements belonging to already processed regions in which case only the topological information is kept and added to the tree, thereby preventing subsequent region growing for such seeds.

In the exemplary embodiment illustrated in FIGS. 7A and 7B, once the initial tree node $A_1$ has been added in the tree, corresponding seeds are placed in the regions neighboring the region $A_1$, i.e. the regions $T_{alpha}$, $T_{beta}$, $T_1$, $T_2$ and $T_{gamma}$ and corresponding tree nodes $T_{alpha}$, $T_{beta}$, $T_1$, $T_2$ and $T_{gamma}$ are added to the tree.

Then, each of these above-mentioned regions is considered in turn in order to find other neighboring regions not yet considered, if any. For example, once tree node $T_1$ has been added in the tree, the region $SB_1$ corresponding to a portion of the adjacent small bowel is found and a corresponding node $SB_1$ is added in the tree.

Once each of the found neighboring regions has been subject to processing steps 140, 150 and 160, and according to processing step 170, the tree is filtered according to predetermined topological parameters to thereby determine the estimation of the topological support of the tubular based structure.

In one embodiment, the filtering of the tree comprises sequentially linking each of the tree nodes one after the other.

In a further embodiment, dead branches and the nodes corresponding to regions having an area or a volume below a predetermined value may be cancelled from the tree, as it will be more detailed below. A dead branch is defined as a portion of the tree that cannot be used for providing a continuous path between the two ends of the tubular based structure, as it will become apparent below.

In still a further embodiment, a portion of the tree that undoubtedly belong to a structure not belonging to the tubular structure of interest, such as a bone structure for example, may also be removed from the tree. Indeed, nodes corresponding to bone portions may have been included in the tree.

The skilled addressee will nevertheless appreciate that a bone removal may be performed, as described in Automatic vessel extraction by patient motion correction and bone removal in brain CT angiography, Helen Hong and al., International Congress Series Volume 1281, May 2005, Pages 369-374. The skilled addressee will also appreciate that various other methods may be considered.

In one embodiment, the predetermined topological parameters may be based on the known topology of the tubular based structure. For instance, the tubular based structure comprises a continuous path between the two ends thereof and the tubular based structure does not comprise looped portions.

At this point, a coarse estimation of a topological support of the tubular based structure may be obtained.

In the embodiment shown in FIGS. 7A and 7B, once the nodes have been linked one after the other, a single continuous path extends between the rectum and the caecum. The skilled addressee will therefore appreciate that this path may be representative of a coarse estimation of the topological support of the tubular based structure. Moreover, since the other branches of the tree may not be used to find a continuous path, they may be optionally cancelled from the tree.

In one embodiment, as it will be more detailed thereinafter, once the estimation of the topological support of the tubular based structure has been determined, an estimated centerline of the tubular based structure may then be determined.

In one embodiment, the center of each of the regions of the continuous path may be used to coarsely estimate the centerline. The skilled addressee will nevertheless appreciate that various other means may be used to provide a coarse estimation of the centerline. For example, a topological thinning of the regions or a centerline extracted from a coarse segmentation of the regions through a voronoi diagram may be used, as described in Skeletonization and its Applications, Kálmán Palágyi, Dept. Image Processing & Computer Graphics University of Szeged, Hungary, Summer School on Image Processing SSIP 2009. Other methods involving level-set processes or distance-based skeletonization may also be used, as known by the skilled addressee.

In a further embodiment, as it will also be detailed thereinafter, the estimation of the topological support of the tubular based structure may then be displayed to an operator.

Figure 2:
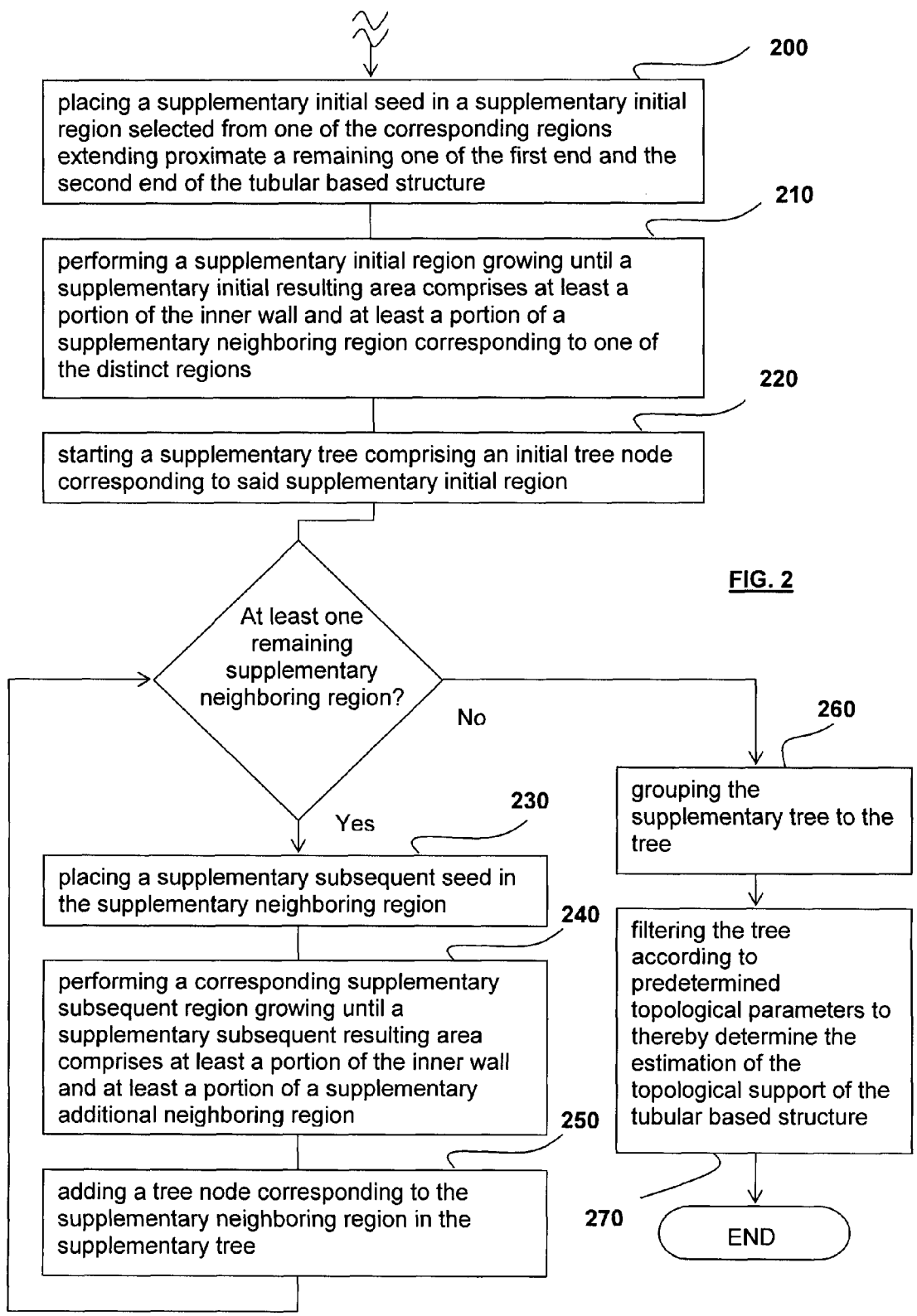
FIG. 2 is a flow chart illustrating another embodiment of a method for determining an estimation of a topological support of a tubular based structure, according to the invention.

Referring now to FIG. 2, in a preferred embodiment, a second initial seed may be used.

Indeed, as shown in FIG. 7A, in order to ensure that the complete tubular structure has been considered, in a preferred embodiment, two initial seeds are advantageously used, a first one proximate to a first end of the tubular structure and a second one proximate to a second end of the tubular structure. In the case wherein the tubular structure is a colon, the two initials seeds are placed proximate to the caecum and the rectum. In this manner, finding a continuous path between the two nodes corresponding to the two initial seeds may ensure that the whole tubular structure has been considered in its entirety, which is of great advantage.

In the exemplary embodiment shown in FIG. 7A, a second initial seed Xr is placed in the rectum. Since there is a continuous path between the two nodes corresponding to the two initial seeds, this continuous path may be representative of a topological support of the whole tubular structure, as it will be described in more details below.

Accordingly, still referring to FIG. 2 and according to processing step 200, a supplementary initial seed is placed in a supplementary initial region selected from one of the corresponding regions.

The skilled addressee will appreciate that in one embodiment it may be advantageous to perform the processing steps associated to the supplementary initial seed in parallel to the processing steps associated to the initial seed. Alternatively, these two processing may be sequentially performed.

In a preferred embodiment, before the supplementary initial seed is placed in the supplementary initial region, the supplementary initial region is first selected, similarly to the initial region of processing step 110. In one embodiment, the selection of the supplementary initial region is manually performed by an operator. Alternatively, in another embodiment, the selection of the supplementary initial region is automatically performed.

In the case of virtual colonoscopy and in one embodiment, the automatic selection of any supplementary seed may be performed by evaluating the volume of air like elements based on the global histogram of the image data, and taking into consideration the human morphology, such as the descending colon is on the right abdominal side of a patient when facing that patient, and corresponds to an elongated air pocket. As well, the sigmoid may be identified based on the hip morphology and looking for a significant air pocket adjacent to the rectum (that is situated at the "bottom" of the image datasets in most cases). These two methods are not limitative and any skilled in the art will understand that such morphological approaches may be numerous without departing from the scope of the present invention.

The skilled addressee will appreciate that, in a further embodiment, a plurality of supplementary seeds may be used simultaneously while each corresponding tree is built accordingly. The skilled addressee will also appreciate that, in one embodiment, rules for the selection of the supplementary seeds may be used in order not to select a region that is already included in one of the trees.

In a preferred embodiment, as previously mentioned, the initial region that is selected extends proximate to an end of the tubular based structure. Still in a preferred embodiment, the supplementary initial region selected extends proximate to another end of the tubular based structure.

As previously mentioned, in the example shown in FIG. 7A, the initial region selected extends proximate to the caecum of the colon while the supplementary initial region selected extends proximate to the rectum of the colon.

According to processing step 210, a supplementary initial region growing is performed until a supplementary initial resulting area comprises at least a portion of the inner wall and at least a portion of a supplementary neighboring region corresponding to one of the distinct regions.

According to processing step 220, a supplementary tree comprising an initial tree node corresponding to the supplementary initial region is started.

Still referring to FIG. 2 and as more detailed below, processing steps 230, 240 and 250 are performed for each of the supplementary neighboring regions found in processing step 220.

Indeed, according to processing step 230, a supplementary subsequent seed is placed in the corresponding supplementary neighboring region.

According to processing step 240, a corresponding supplementary subsequent region growing is performed until a supplementary subsequent resulting area comprises at least a portion of the inner wall and at least a portion of a supplementary additional neighboring region.

According to processing step 250, a tree node corresponding to the supplementary neighboring region is added in the supplementary tree.

Still referring to FIG. 2, processing steps 230, 240, and 250 are performed for each of the supplementary additional neighboring regions found in processing step 240.

Once each of the found supplementary neighboring regions have been subject to processing steps 230, 240 and 250, and according to processing step 260, the supplementary tree is grouped with the tree.

In one embodiment, the grouping of the supplementary tree and of the tree may comprise finding at least one node in each tree that correspond to a same region and merging the two tree together according to this common node. The skilled addressee will nevertheless appreciate that various other procedures may be considered for grouping the tree together, as it will be detailed below.

According to processing step 270, the tree may then be filtered according to predetermined topological parameters to thereby determine the estimation of the topological support of the tubular based structure.

The skilled addressee will appreciate that, for the particular application of the determination of the topological support of a colon, at least one auxiliary seed may be used. Indeed, in some cases, the colon of the patient under examination may be collapsed, due to a nervous spasm during the image acquisition and/or the presence of an obstructive tumor for example. When a colon is collapsed, the inner wall thereof may obstruct the passage between the caecum and the rectum. The volume inside the colon is then partitioned into a plurality of tubular based portion and the method described above with reference to FIG. 1 may not provide the estimated topological support for the whole length of the colon, as it will be detailed thereinafter. In this case, a corresponding number of auxiliary seeds may be used for adding corresponding tree nodes to the tree until the tree comprises at least one continuous path between the tree nodes corresponding to each of the initial seed and the supplementary initial seed.

In one embodiment, a corresponding auxiliary tree is built for each of the auxiliary seeds and the auxiliary trees are then grouped to the tree.

The skilled addressee will also appreciate that such auxiliary seeds may be used in the case wherein the tubular based structure comprises more than two ends. In this case, it may be advantageous to use a corresponding initial seed for each end of the tubular based structure in order to ensure that the complete structure has been considered.

In the case of virtual colonoscopy and in one embodiment, the morphological parameters of the colon may be used for placing the auxiliary seeds. For example, since the colon is a continuous elongated structure, the auxiliary seeds may be placed in the spatial prolongation of the tree or the auxiliary trees.

As previously mentioned, at this point, a coarse estimation of a topological support of the colon may be obtained. The skilled addressee will appreciate that this coarse estimation has been obtained without segmenting any region, which is of great advantage as it will become apparent below.

The skilled addressee will appreciate that this coarse estimation may be used to provide a coarse centerline of the tubular structure, which is of great advantage. Indeed, based on this coarse centerline, a 2D fly-through visualization may be provided. In other words, all the portions of the images which are not of interest may be masked according to the obtained coarse centerline. This is of great advantage since an operator may review the image data in a more convenient way without be disturbed by other regions of the images which are not of interest. This is particularly advantageous since it may greatly speed up the review of the images by the operator while reducing the training typically required for reviewing the images. Such approach may be a great value for inexperienced readers that may be distracted by remnant tagged fluid in a different portion of the same image, or by the presence of a major lesion at a different portion of the image to name a few.

The skilled addressee will also appreciate that a 3D fly-through visualization using a volume rendering process may also be provided.

As previously explained, the coarse estimation of the topological support of the tubular structure that has been obtained is based on the fact that there is an alternation of the air type regions and the tagged regions inside the colon and therealong between the caecum and the rectum and that this alternation helps to determine the topological support.

Thus, in the above described method, the interfaces between the air type regions and the tagged regions and the interfaces between the air type regions or the tagged regions and the tissues of the colon have not been used nor considered for providing the coarse estimation.

The skilled addressee will appreciate that, typically, at these interfaces, identification of the different types of region may be difficult, mainly since they may comprise unmarked or inhomogeneous marked fecal matter.

In a preferred embodiment of the method, a refined estimation of the topological support of the colon may further be obtained. This refined estimation is obtained by defining a belonging or a classification of each of the interfaces of interest, i.e. the interfaces corresponding to the branches extending between two consecutive nodes of the tree. In fact, once an interface of interest has been defined as an air type region-tagged region interface or an interface with the tissues of the colon, the filtering of the tree may be improved, as detailed thereinafter.

Figure 3:
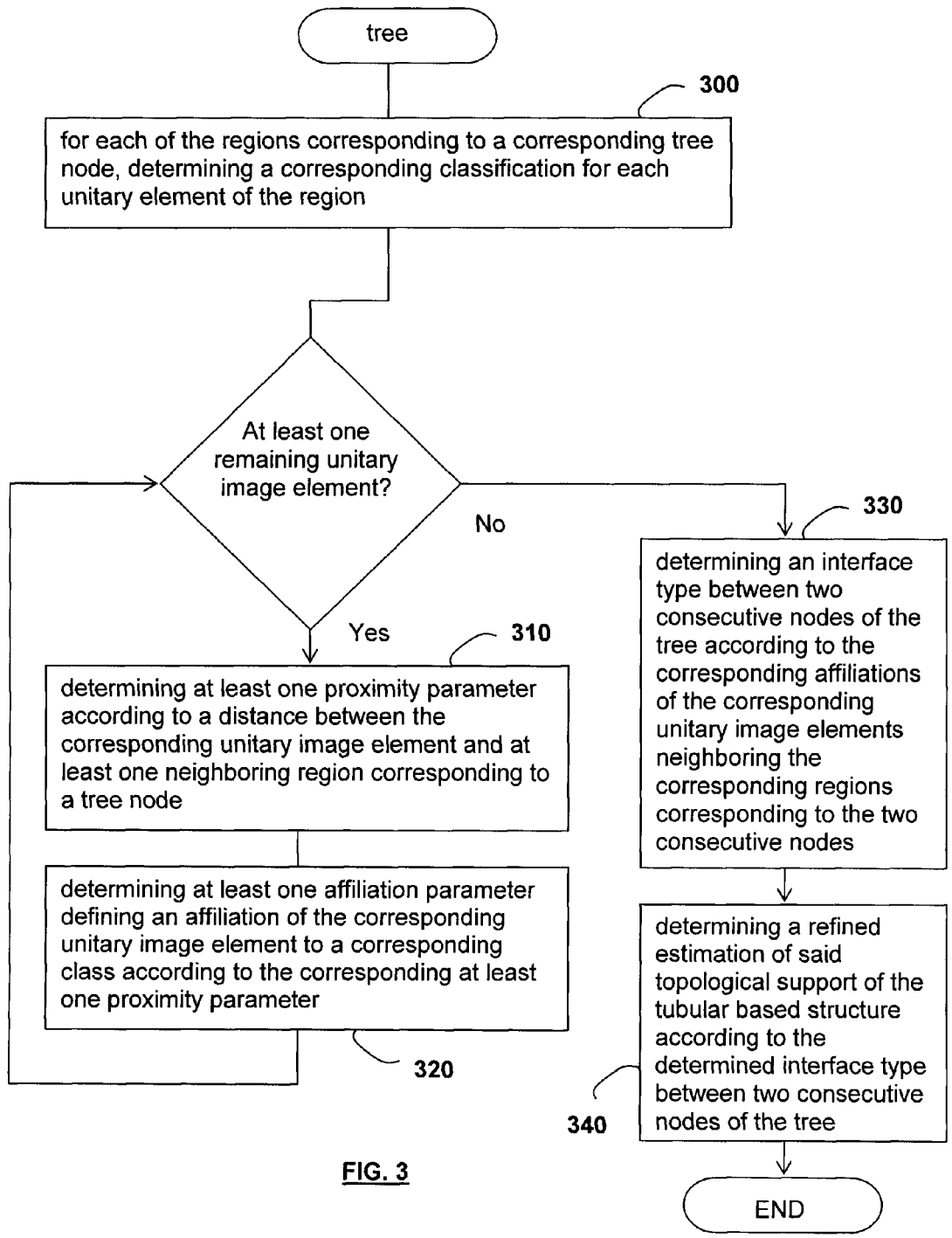
FIG. 3 is a flow chart illustrating another embodiment of a method for determining an estimation of a topological support of a tubular based structure, according to the invention.

Referring now to FIG. 3, a further embodiment of the method will now be described. In this embodiment, a refined estimation of the topological support of the tubular based structure may be determined. As it will be appreciated thereinafter by the skilled addressee, in this embodiment, the various types of interface may be identified and classified to further refine the estimation of the topological support.

Accordingly, according to processing step 300, once the tree has been obtained, a corresponding classification for each unitary element of each of the regions corresponding to a corresponding tree node is determined. In other words, once a region has been identified as a first substance type region or a second substance type region during processing steps 120, 150, 210 or 240, each unitary image element of this region is considered as belonging to this type of region.

In one embodiment, the determining of a classification comprises assigning a first substance class to each unitary image element of each of the first substance regions corresponding to a corresponding tree node and assigning a second substance class to each unitary image element of each of the second substance regions corresponding to a corresponding tree node. In the particular application of colon topology estimation, the corresponding unitary image elements have been "classified" as belonging to an air type region or a tagged region.

At this point, remaining unitary elements that have not yet been considered belong either to an air region-tagged region interface or to an interface interfacing with the tissues of the colon.

Further processing steps may be performed in order to provide an identification of the type of the interface extending between two consecutive nodes of the tree. Once the interfaces of interest are properly identified, a refined estimation of the topological support may be provided, as it will become apparent to the skilled addressee upon reading of the following description.

Still referring to FIG. 3, in order to identify the type of each of the interfaces of interest, processing steps 310 and 320 may be performed for each remaining unitary image element comprised in the corresponding resulting area of each of the region growings, as detailed below.

According to processing step 310, at least one proximity parameter is determined for each of the unitary image elements of interest according to a distance between the corresponding unitary image element and at least one neighboring region corresponding to a tree node. The skilled addressee will appreciate that using a proximity parameter may be advantageous since it does not rely on a segmentation process nor on a quantitative parameter but rather on a qualitative parameter.

In one embodiment, a plurality of proximity parameters may be used in order to take into consideration each distance between the unitary image element of interest and each of the regions extending therearound.

According to processing step 320, at least one affiliation parameter defining an affiliation of the corresponding unitary image element to a corresponding class is determined according to the corresponding at least one proximity parameter. The skilled addressee will appreciate that the determination of affiliation parameters may be advantageous since it does not alter nor modify the image data.

In one embodiment, the affiliation of the unitary image element may be determined according to various additional parameters. For example, the morphology and shape of the neighboring regions surrounding the selected unitary image element may be considered, as well as the overall topology of the tubular based structure. In a further embodiment, one of such morphology parameters will leverage the fact that physically speaking, remnant fluids will have a tendency to flatten their surface as any other fluids. Realizing that large flat regions are unlikely to depict hollow organs such as the lumen, this may be a great differentiator to characterize Tag/Air interfaces (the horizontal surface being the upper portion of the remnant tagged fluid.

Processing steps 310 and 320 are performed for each of the unitary image elements of interest, i.e. those facilitating the identification of the interfaces of interest.

Once each of the unitary image elements of interest have been subject to processing steps 310 and 320, and according to processing step 330, an interface type between two consecutive nodes of the tree is determined according to the corresponding affiliations of the corresponding unitary image elements neighboring the corresponding regions corresponding to the two consecutive nodes.

In one embodiment, the determining of an interface type between two consecutive nodes of the tree is further performed according to at least one additional parameter selected from the group consisting of a density based distribution of the corresponding unitary image elements, a distribution based homogeneity of the corresponding unitary image elements, the topological information of the structure of interest and a morphological parameter of the interface type. The skilled addressee will appreciate that the expression "density based distribution" should be understood as encompassing the density distribution, derivative forms thereof as well as any combination thereof. Similarly, the expression "distribution based homogeneity" should be understood as encompassing the distribution homogeneity, derivative forms thereof as well as any combination thereof.

Indeed, the specific density distribution and distribution homogeneity of the unitary image elements of an interface of interest may be used to determine the type of interface, as described in PCT application published under publication number WO/2007/048091 and entitled Structure-analysis system, method, software arrangement and computer-accessible medium for digital cleansing of computed tomography colonography images. It is worth noting that proximity parameters and topological knowledge of the tubular structure are not discussed in this PCT application.

Additionally, the morphology of the interface of interest may also be considered. For example, the thickness and the volume of the interface of interest may be considered. Moreover, the shape of the interface, such as a plane shape or a flared shape, may also be particularly useful.

In one embodiment, each remaining unitary image element not belonging to any regions but processed during the process of identification of subsequent regions is grouped with the others as potential interface type elements.

In another embodiment, the potential interface type elements are grouped in two groups based on the topological information of the tree, such two groups being non-interface elements and interface type elements, interface type elements being between two consecutive nodes of the tree.

Still referring to FIG. 3, according to processing step 340, a refined estimation of the topological support of the tubular based structure is determined according to the determined interface type between two consecutive nodes of the tree.

The skilled addressee will appreciate that, in the embodiment previously described, the filtering of the tree may be enhanced thanks to the type of the interfaces between the tree nodes.

In one embodiment, as previously mentioned, the filtering of the tree may comprise sequentially linking each of the tree nodes one after the other.

Then, the tree will generally comprise at least one main path and eventually at least one of a closed loop and an additional branch.

In one embodiment, the tree is filtered by cancelling at least one of a portion of the closed loop and the at least one additional branch, typically a dead branch.

In a preferred embodiment, the dead branches, if any, which cannot be used to provide a continuous path between the two extremities of the tubular based structure are cancelled from the tree. In a further embodiment, the tree is further filtered by cancelling the portions of the closed loops, if any, whose first nodes are associated to regions having a region volume below a defined value.

In others words, smaller regions, generally tagged regions extending against the inner wall of the colon without occupying a whole section of the colon may be cancelled from the tree. Indeed, if a small tagged region is the first node of a portion of a closed loop, it may be a part of a portion of the tree which corresponds to regions outside the colon such as small bowel portions or bones. It may also be an incorrect short cut between two regions extending in the colon, as illustrated in FIGS. 8A to 9B and as detailed below.

Indeed, in FIG. 7B, the branch comprising the node SB1 may be cancelled since it corresponds to a dead branch, as previously mentioned.

Figure 8A:
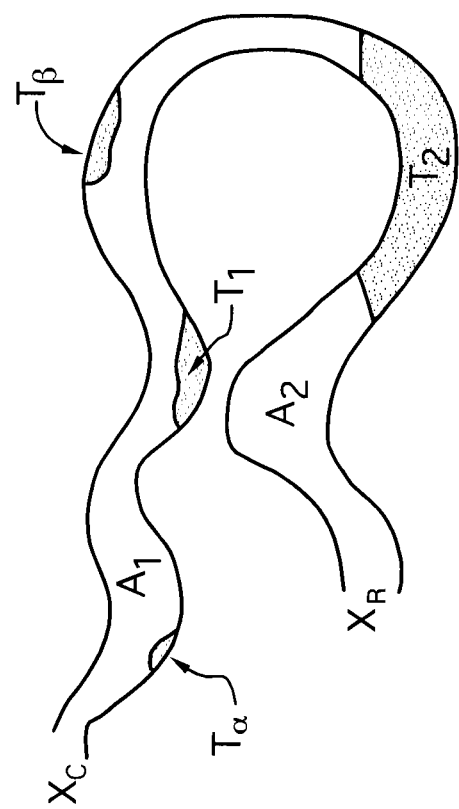
FIG. 8A is a schematic illustrating another embodiment of a tubular based structure.
Figure 8B:
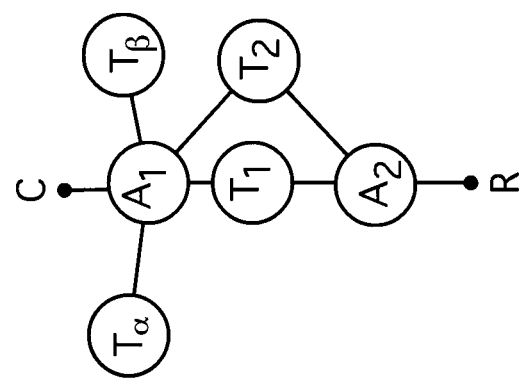
FIG. 8B is a schematic illustrating a tree corresponding to the tubular based structure shown in FIG. 8A.

In FIG. 8B, the looped portion comprising the node T1 may be cancelled since the corresponding interface T1-A1 should be identified as extending in soft tissues, as illustrated in FIG. 8A.

Figure 9B:
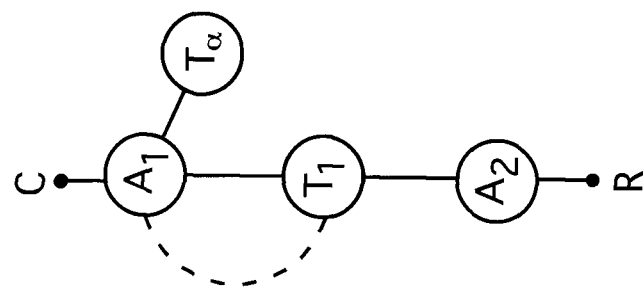
FIG. 9B is a schematic illustrating a tree corresponding to the tubular based structure shown in FIG. 9A.
Figure 9A:
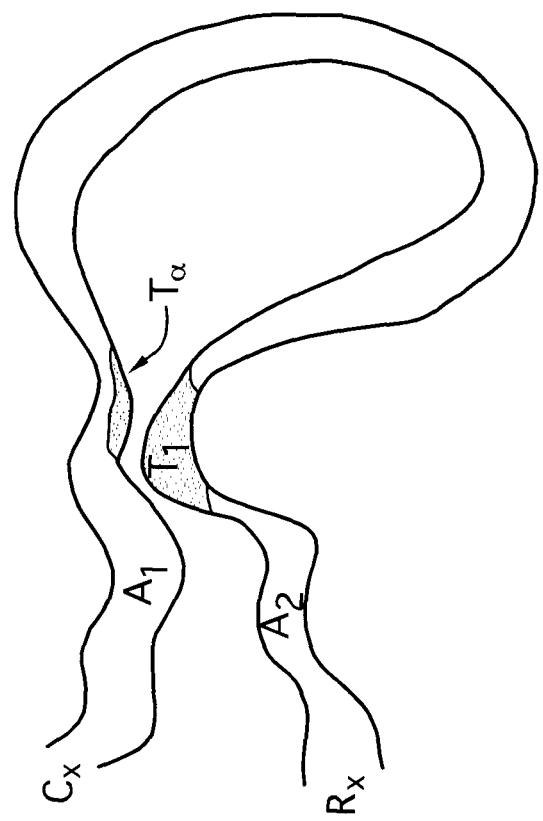
FIG. 9A is a schematic illustrating another embodiment of a tubular based structure.

In FIGS. 9A and 9B, the skilled addressee will appreciate that the classification of the interfaces may help to select a convenient path between the regions A1 and T1.

In a preferred embodiment, a refined estimated centerline of the tubular based structure is determined according to the refined estimation of the topological support.

The skilled addressee will appreciate that this embodiment may be of particular interest since the centerline of the tubular based structure may be sufficiently affined to enable a convenient review of the structure.

In one embodiment, the refined estimated centerline along with the image data may be provided to a volume rendering engine for 3D visualization. In a further embodiment, the image data may be subject to a prior electronic cleansing procedure for removing the tagged substance regions. Such an electronic cleansing procedure is disclosed in co-pending PCT application by the same applicant entitled "Method and system for filtering image data and use thereof in virtual endoscopy", the specification of which is incorporated herein by reference.

The skilled addressee will appreciate that, in one embodiment, the initial region growing is performed, a first substance threshold for the first substance regions and a second substance threshold for the second substance regions may be determined, according to the type of image data provided.

According to another aspect, once the topology of the structure has been performed, the interface regions may be processed and a subsequent reconstruction of the processed interface region according to the nature or the characteristics of the structure of interest may be performed, as illustrated in FIGS. 11 to 15.

In one embodiment, means to process interface regions and subsequent reconstruction of the processed regions according to the nature of the colonic mucosa are provided.

In one embodiment, means to process interface type elements between two consecutive nodes of the tree are provided.

In another embodiment, means to process the interface type elements between an air type region and a tagged type region in virtual colonoscopy are provided.

In yet a further embodiment, the processing of the interface type elements is performed by attributing a value density to every interface type elements that is different than that of typical colonic mucosa elements. For example, in one embodiment, the processing of the interface type elements is performed by attributing an air density to every interface type elements. The skilled addressee will appreciate that other values may be chosen, such as a value below the value of the air type region.

In a further embodiment, prior to the processing of the interface-type elements, the interface-type regions are expanded.

In one embodiment, the expansion of the interface-type regions is performed while maintaining the actual topology of the structure of interest.

In another embodiment, the processing of the interface-type elements is followed by a reconstruction of the processed interface-type region according to the nature or the characteristics of the structure of interest.

In a further embodiment, the reconstruction of the processed interface-type region is performed according to the implicit information of every new elements gathered during the expansion process. It is worth mentioning that by the expression "implicit", it is meant any implied or understood though not directly expressed. For Example, the mucosa is never directly expressed since it is a 3D region comprising unsegmented unitary image element (i.e. a surface region between air and tissue), but implicit characteristics such as normal field of this mucosa may be extracted via the gradient field of the intensity values.

In one embodiment, the reconstruction of the processed region is performed by attributing density values to each of the interface-type elements, considering the implicit information of every elements belonging to every other neighboring regions.

In one embodiment, the reconstruction of the processed region is performed by attributing density values to each of the interface-type elements considering the implicit information of every elements of the regions corresponding to the regions surrounding the interface-type regions.

In yet a further embodiment, the attribution of density values to each of the interface-type elements is performed by considering the implicit information of the relative spatial strength obtained from normal vectors determined from the density of the elements of the neighboring regions.

In one embodiment, the implicit information is one or a combination of the gradient vector field, a vector field and a density-based vector field, In another embodiment, the implicit information is one or a combination of a scalar field, a vector field and a tensor field.

Still referring to FIGS. 11 to 15, description of the process based on the implicit information will be detailed. Isolation of the intersection of the neighboring region of the given interface and the neighboring regions of the two distinct regions connected by the interface may be performed, in one embodiment. This isolation portion of the interface neighboring region is called the reconstruction support.

Implicit geometrical characteristics may be extracted, providing information about the support behaviour at the very limit of the interface region to reconstruct. A common characteristic is the implicit normal vector field based on the gradient of the image element intensity. The skilled in the art will understand that such implicit information allows for the reconstruction of every unitary image element within the interface type region, but is of particular interest for the region surrounding the colonic mucosa for the particular case of virtual colonoscopy.

The probability of each elements of the interface to belong to the target region (Air) may be computed. This probability, or membership, is computed in order to maximize the continuity of the given implicit characteristic. In the case of the normal vector field, the membership of each voxel is based on the intensity of the projection of: the vector formed by the center of the given voxel to reconstruct and the center of support neighboring voxels; and the implicit normal vector at the support neighboring voxel.

Intensity values in the interface region are reconstructed between distribution of the target region and the support region according to their membership.

Figure 15:
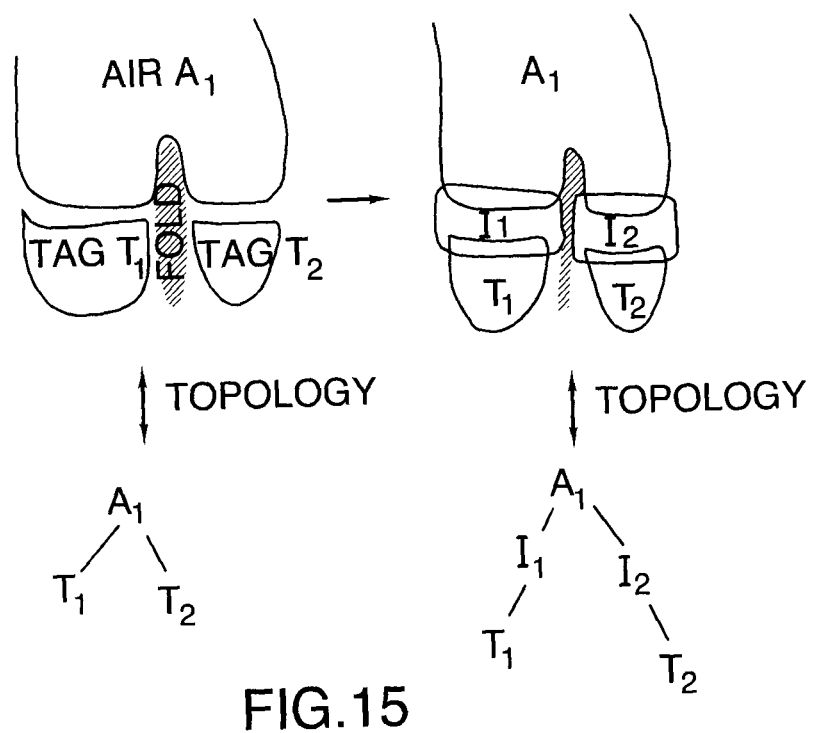

FIG. 15 shows how adjacent interfaces may be processed in order to prevent cutting potential folds in the colon thanks to the preservation of the defined topology of interest, which is a great advantage over the techniques of the prior art that often cut the folds.

According to another aspect, there is also provided a system for determining an estimation of a topological support of a tubular based structure.

Figure 4:
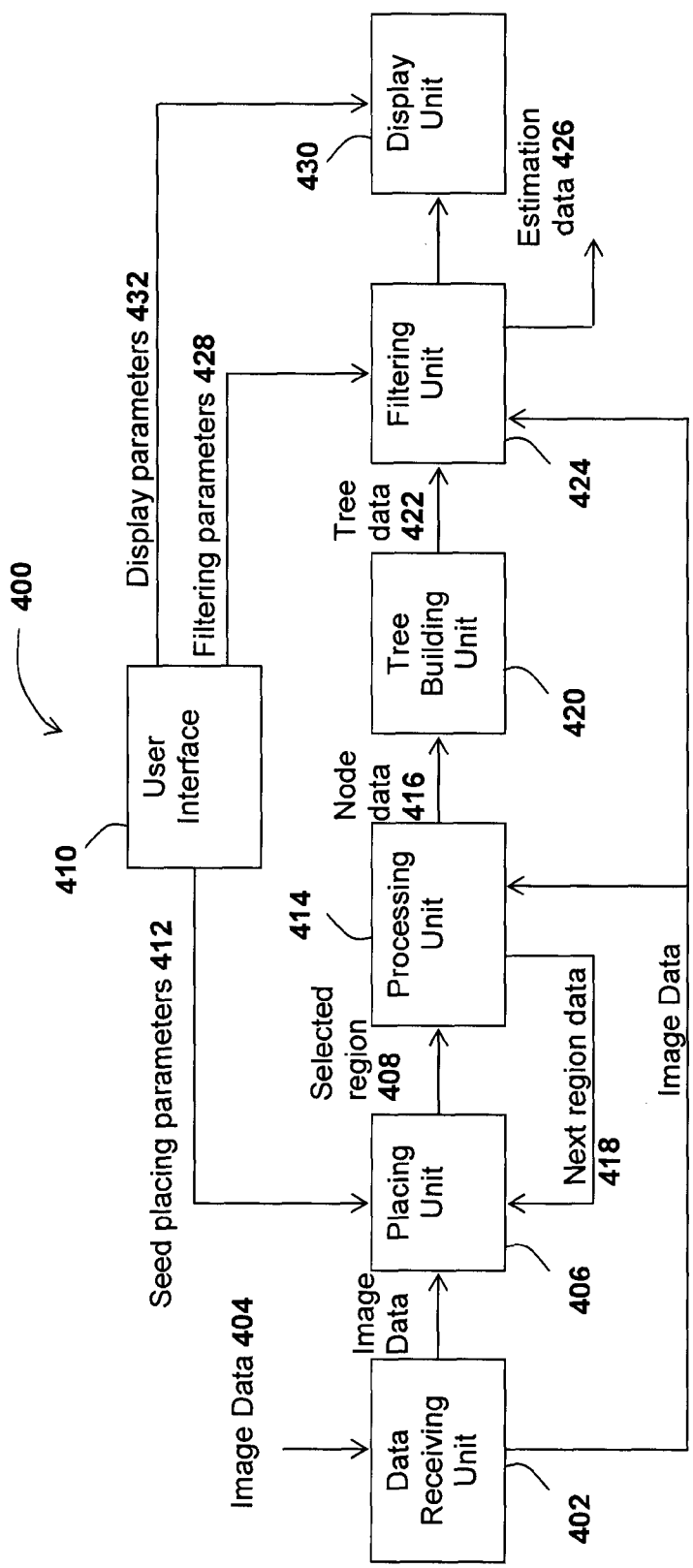
FIG. 4 is a block diagram of one embodiment of a system for determining an estimation of a topological support of a tubular based structure, according to the invention.

Referring to FIG. 4, there is shown an embodiment of such a system. The system 400 comprises a data receiving unit 402 for receiving the image data 404 representative of the tubular based structure.

The system 400 also comprises a placing unit 406 operatively coupled to the data receiving unit 402 for placing each of the seeds in each of the corresponding regions. The placing unit 406 receives the image data 404 from the data receiving unit 402 and provides the selected region 408.

In one embodiment, the placing unit 406 comprises a module (not shown) adapted for identifying the initial regions proximate to the ends of the tubular structure in order to place the two initial seeds, as previously detailed.

In another embodiment, the system 400 may comprise an optional user interface 410 operatively connected to the placing unit 406 for providing seed placing parameters 412 thereto to thereby provide to the operator a means for assisting the placing of the initial seeds. In a preferred embodiment, the user interface 410 is omitted and the seeds are placed automatically, without any intervention of the operator.

The system 400 comprises a processing unit 414 operatively coupled to the placing unit 406 for performing each of the region growings. The processing unit 414 receives the selected region 408 from the placing unit 406 and provides node data 416. The skilled addressee will appreciate that the processing unit 414 also provides next region data 418 to the placing unit 406 for placing the subsequent seed in the corresponding region until each of the regions of interest has been considered.

The system 400 comprises a tree building unit 420 operatively coupled to the processing unit 414 for building the tree. The tree building unit 420 receives the node data 416 from the processing unit 414 and provides tree data 422 in response thereto.

The system 400 comprises a filtering unit 424 operatively coupled to the tree building unit 420 for filtering the tree according to the predetermined topological parameters to thereby determine the estimation of the topological support of the tubular based structure. The filtering unit 424 receives tree data 422 from the tree building unit 420 and provides in response thereto estimation data 426.

In one embodiment, the optional user interface 410 is operatively connected to the filtering unit 424 for providing filtering parameters 428 thereto to thereby provide to the operator a means for assisting the filtering of the tree. In a preferred embodiment, the user interface 410 is omitted and the tree is filtered automatically, without any intervention of the operator.

Still referring to FIG. 4, in one embodiment, the system may further comprise an optional display unit 430 operatively coupled to the filtering unit 424 for receiving the estimation data 426 and displaying the estimation of the topological support of the tubular based structure. In a further embodiment, the user interface 410 may be operatively connected to the display unit 430 for providing display parameters 432 thereto.

In another further embodiment not illustrated, the system 400 may further comprises a transmitting unit coupled to the filtering unit 424 for transmitting the estimation data 426 either to a computer-aided detection unit (not shown) for abnormalities detection or to a computer-aided diagnosis unit (not shown) for abnormalities diagnosis. The transmitting unit may comprise a wireless module (not shown) for providing a wireless transmission of the estimation data 426. The skilled addressee will appreciate that the estimation data may be transmitted using the wireless module according to various protocols without departing from the scope of this application. The skilled addressee will also appreciate that a wired transmission may be used. In one embodiment, the transmission is performed using the internet.

The system for determining an estimation of a topological support of a tubular based structure as previously described is of great advantage since it may enable a remote processing of the image data. Indeed, the image data may be acquired at the premises of a clinic or an hospital equipped with imaging devices, sent via a public or private data network to a remote processing center and processed at the processing center. The estimation data may then be sent to the clinic or hospital for visual analysis by a given doctor.

Alternatively, the skilled addressee will appreciate that the system may be integrated to the imaging device or be operatively connected thereto.

The skilled addressee will also appreciate that, in one embodiment, the method for determining an estimation of a topological support of a tubular based structure may be embedded in a computer program running on a processing device. The computer program may comprise instructions recorded on a machine readable medium for performing the above-described method for determining an estimation of a topological support.

According to another aspect, there is also provided a method of doing business in determining an estimation of a topological support of a tubular based structure according to the method previously described.

In one embodiment, the estimation of the topological support of the tubular based structure is determined for a fee.

In another embodiment, the method of doing business comprises receiving the image data; performing the method for determining an estimation of a topological support of a tubular based structure as previously described; and providing the estimation of the topological support of the tubular based structure for a fee.

In another embodiment, the method of doing business in determining an estimation of a topological support of a tubular based structure comprises providing by a provider a system for determining an estimation of a topological support of a tubular based structure as previously described to a third party; operating the system, wherein the operating is done by a third party for a fee; and reconveying by the third party at least a portion of the fee to the provider.

It will be appreciated that the system for determining an estimation of a topological support of a tubular based structure described herein may be operated by the owner of the system. Alternatively, the system may be operated by a third party for a fee. In one embodiment, the fee may be a share of the revenues while in an alternative embodiment, the fee may comprise a fixed fees.

Figure 6:
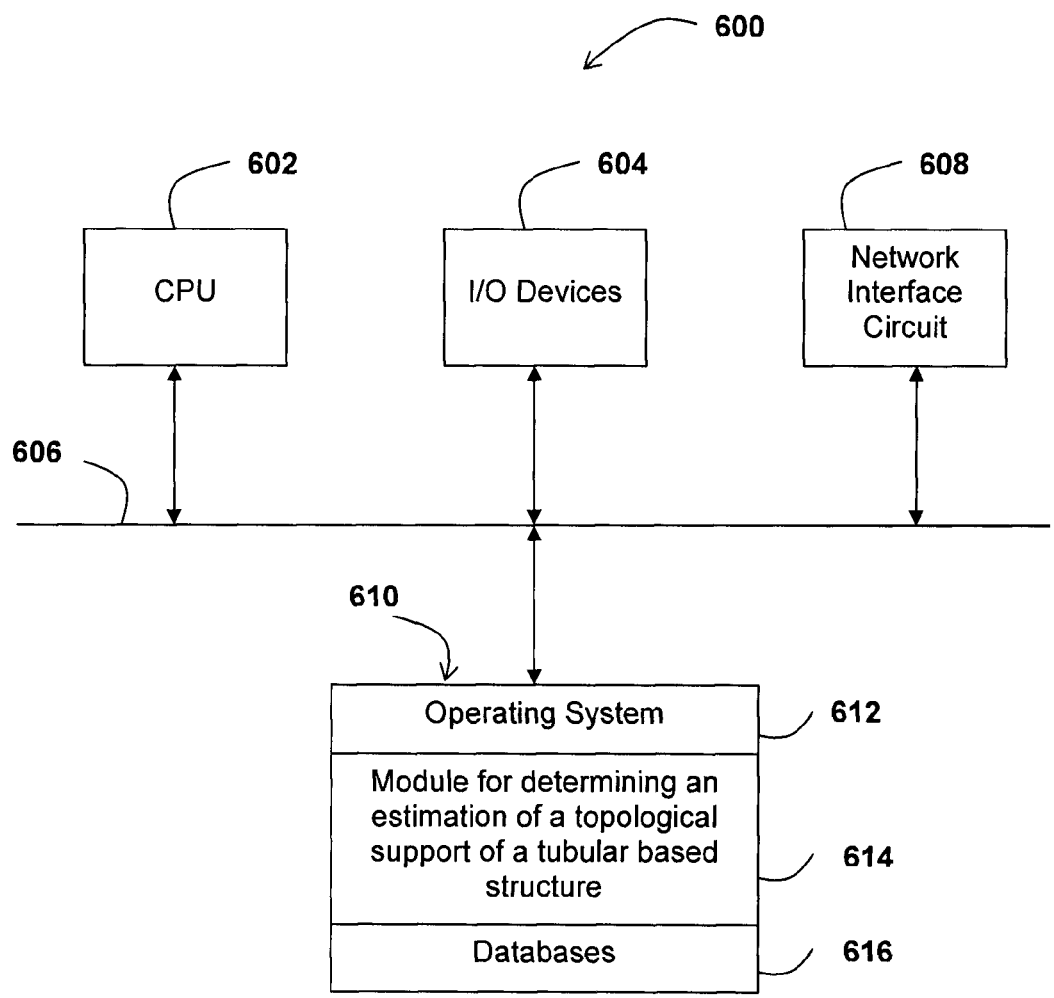
FIG. 6 is a block diagram showing an embodiment of a processing device in which the method for determining an estimation of a topological support may be implemented.

Now referring to FIG. 6, there is shown an embodiment of a processing device 600 in which the method for determining an estimation of a topological support of a tubular based structure may be advantageously used.

The processing device 600 comprises a central processing unit 602, I/O devices 604, a network interface circuit 608, a data bus 606 and a memory 610. The central processing unit 602, the I/O devices 604, the network interface circuit 608 and the memory 610 are operatively coupled using the data bus 606.

More precisely, the central processing unit 602 is adapted for processing data instructions. The network interface circuit 608 is adapted for operatively connecting the processing device 600 to another processing device (not shown) via a data network (not shown). The skilled addressee will appreciate that various embodiments of the network interface circuit 608 may be provided. Moreover, the skilled addressee will also appreciate that the network interface circuit 608 may operate according to various communication protocols such as TCP/IP for instance.

The I/O devices 604 are used for enabling a user to interact with the processing device 600. The skilled addressee will appreciate that various embodiments of the I/O devices 604 may be used. For example, the I/O devices 604 may comprise at least one of a keyboard, a screen and a mouse.

The skilled addressee will appreciate that various embodiments of the data bus 606 may be provided.

It will also be appreciated that various embodiments of the memory 610 may be provided. Moreover, it will be appreciated that the memory 610 may be used to store in one embodiment an operating system 612, a module for determining an estimation of a topological support of a tubular based structure 614 and databases 616 used for operating the module for determining an estimation of a topological support of a tubular based structure 614.

The skilled addressee will appreciate that the operating system 612 is used for managing the interactions between the central processing unit 602, the I/O devices 604, the network interface circuit 608, the data bus 606 and the memory 610.

Although the above description relates to specific preferred embodiments as presently contemplated by the inventor, it will be understood that the invention in its broad aspect includes mechanical and functional equivalents of the elements described herein. For example, the method may be applied to the examination of different human anatomical structures as well as animal structures.

What is claimed is:

1. A method for determining an estimation of a topological support of a tubular based anatomic structure comprising an inner wall and a plurality of distinct first regions and a plurality of distinct second regions, said first and second regions having respective first and second substances that are different and have different densities from each other and wherein said first substance density is representative of the anatomic structure, said method comprising:
   a) obtaining image data representative of the tubular based anatomic structure;
   b) placing an initial seed in an initial region selected from one of said plurality of distinct first regions;
   c) performing an initial region growing until an initial resulting area comprises at least a portion of said inner wall and at least a portion of a neighboring region corresponding to one of said plurality of distinct second regions;
   d) starting a tree comprising an initial tree node corresponding to said initial region;
   e) for each neighboring region:
      placing a subsequent seed in said neighboring region;
      performing a corresponding subsequent region growing until a subsequent resulting area comprises at least a portion of said inner wall and at least a portion of an additional neighboring region, wherein said additional neighboring region has a substance that is different from the substance in the region in which the subsequent seed was placed; and
      adding a tree node corresponding to said neighboring region in said tree;
   f) performing processing step e) for further additional neighboring regions;
   g) filtering said tree according to predetermined topological parameters to thereby determine said estimation of said topological support of the tubular based anatomic structure; and
   h) performing at least one of storing and displaying at least one part of the estimation of said topological support of the tubular based anatomic structure.

2. The method for determining an estimation of a topological support of a tubular based structure according to claim 1, wherein said image data are selected from the group consisting of volumetric medical image data, volumetric tomographic image data and a set of parallel successive image planes.

3. The method for determining an estimation of a topological support of a tubular based structure according to claim 1, wherein said image data are representative of an anatomic structure.

4. The method for determining an estimation of a topological support of a tubular based structure according to claim 1, wherein said image data comprises a plurality of unitary image elements selected from the group consisting of pixels and voxels.

5. The method for determining an estimation of a topological support of a tubular based structure according to claim 1, wherein in said performing a corresponding subsequent region growing, said additional neighboring region is selected such that each of said neighboring region and said additional neighboring region respectively belongs to a corresponding one of said plurality of first substance regions and said plurality of second substance regions.

6. The method for determining an estimation of a topological support of a tubular based structure according to claim 1, wherein said performing an initial region growing is performed until said initial resulting area further comprises at least a portion of outer surroundings of the inner wall of the tubular based structure.

7. The method for determining an estimation of a topological support of a tubular based structure according to claim 1, wherein said performing a corresponding subsequent region growing is performed until said subsequent resulting area further comprises at least a part of outer surroundings of the inner wall of the tubular based structure.

8. The method for determining an estimation of a topological support of a tubular based structure according to claim 1, wherein said performing an initial region growing is performed until said initial resulting area comprises said initial region.

9. The method for determining an estimation of a topological support of a tubular based structure according to claim 1, wherein said performing a corresponding subsequent region growing is performed until said subsequent resulting area comprises said neighboring region.

10. The method for determining an estimation of a topological support of a tubular based structure according to claim 9, further comprising before said performing an initial region growing, determining a first substance threshold for the first substance regions and a second substance threshold for the second substance regions.

11. The method for determining an estimation of a topological support of a tubular based structure according to claim 1, further comprising:
   i) placing a supplementary initial seed in a supplementary initial region selected from one of the corresponding regions;
   ii) performing a supplementary initial region growing until a supplementary initial resulting area comprises at least a portion of said inner wall and at least a portion of a supplementary neighboring region corresponding to one of said distinct regions;
   iii) starting a supplementary tree comprising an initial tree node corresponding to said supplementary initial region;
   iv) for each supplementary neighboring region:
      placing a supplementary subsequent seed in said supplementary neighboring region;
      performing a corresponding supplementary subsequent region growing until a supplementary subsequent resulting area comprises at least a portion of said inner wall and at least a portion of a supplementary additional neighboring region; and
      adding a tree node corresponding to said supplementary neighboring region in said supplementary tree;
   v) performing processing step iv) for each of said supplementary additional neighboring regions; and
   vi) grouping said supplementary tree to said tree.

12. The method for determining an estimation of a topological support of a tubular based structure according to claim 11, further comprising, before said placing a supplementary initial seed in an supplementary initial region, selecting said supplementary initial region.

13. The method for determining an estimation of a topological support of a tubular based structure according to claim 12, wherein said selecting said supplementary initial region comprises selecting said supplementary initial region proximate to a remaining end of the tubular based structure.

14. The method for determining an estimation of a topological support of a tubular based structure according to claim 11, further comprising using a corresponding number of auxiliary seeds for adding corresponding tree nodes to the tree until said tree comprises at least one continuous path between the tree nodes corresponding to each of said initial seed and said supplementary initial seed.

15. The method for determining an estimation of a topological support of a tubular based structure according to claim 11, further comprising using a corresponding number of auxiliary seeds for adding corresponding tree nodes to the tree until the tree comprises a corresponding one tree node for each of said distinct regions.

16. The method for determining an estimation of a topological support of a tubular based structure according to claim 1, further comprising, before said placing an initial seed in an initial region, selecting said initial region.

17. The method for determining an estimation of a topological support of a tubular based structure according to claim 16, wherein said selecting said initial region comprises selecting said initial region proximate to an end of the tubular based structure.

18. The method for determining an estimation of a topological support of a tubular based structure according to claim 1, wherein said image data comprise a plurality of unitary image elements, the method further comprising, for each of said regions corresponding to a corresponding tree node, determining a corresponding classification for each unitary element of said region.

19. The method for determining an estimation of a topological support of a tubular based structure according to claim 18, wherein said plurality of distinct regions comprises a plurality of first substance regions and a plurality of second substance regions, and wherein said determining a classification comprises assigning a first substance class to each unitary image element of each of said first substance regions corresponding to a corresponding tree node and assigning a second substance class to each unitary image element of each of said second substance regions corresponding to a corresponding tree node.

20. The method for determining an estimation of a topological support of a tubular based structure according to claim 19, further comprising:
   for each remaining unitary image element not comprised in the corresponding resulting area of each of said region growings:
      determining at least one proximity parameter according to a distance between the corresponding unitary image element and at least one neighboring region corresponding to a tree node; and
      determining at least one affiliation parameter defining an affiliation of the corresponding unitary image element to a corresponding class according to the corresponding at least one proximity parameter;

determining an interface type between two consecutive nodes of the tree according to the corresponding affiliations of the corresponding unitary image elements neighboring the corresponding regions corresponding to said two consecutive nodes; and determining a refined estimation of said topological support of the tubular based structure according to the determined interface type between two consecutive nodes of the tree.

21. The method for determining an estimation of a topological support of a tubular based structure according to claim 20, wherein said determining an interface type between two consecutive nodes of the tree is further performed according to at least one additional parameter selected from the group consisting of a density based distribution of the corresponding unitary image elements, a distribution based homogeneity of the corresponding unitary image elements and a morphological parameter of said interface type.

22. The method for determining an estimation of a topological support of a tubular based structure according to claim 20, further comprising determining an estimated centerline of the tubular based structure according to said refined estimation.

23. The method for determining an estimation of a topological support of a tubular based structure according to claim 1, further comprising determining an estimated centerline of the tubular based structure according to said estimation of said topological support of the tubular based structure.

24. The method for determining an estimation of a topological support of a tubular based structure according to claim 1 wherein said filtering said tree comprises sequentially linking each of said tree nodes one after the other.

25. The method for determining an estimation of a topological support of a tubular based structure according to claim 1, wherein said tree comprises at least one main path and at least one of a closed loop and an additional branch, said filtering said tree comprising cancelling from said tree at least one of a portion of the closed loop and the at least one additional branch.

26. The method for determining an estimation of a topological support of a tubular based structure according to claim 25, wherein said cancelling is performed according to a region volume of each of the distinct regions associated to a corresponding node.

27. The method for determining an estimation of a topological support of a tubular based structure according to claim 1, wherein said tubular based structure comprises at least a portion of a colon.

28. The method for determining an estimation of a topological support of a tubular based structure according to claim 1, wherein said tubular based structure comprises at least a portion of a colon and wherein said plurality of distinct regions comprises a plurality of air type regions and a plurality of tagged substance type regions.

29. The method for determining an estimation of a topological support of a tubular based structure according to claim 1, wherein at least one part of the estimation of said topological support of the tubular based structure is displayed, further wherein said displaying comprises masking in said image data surroundings of the tubular based structure.

30. A non-transitory machine readable medium having instructions recorded thereon for performing the method for determining an estimation of a topological support of a tubular based structure as claimed in claim 1.

31. A system for performing the method as claimed in claim 1, said system comprising:

a data receiving unit for receiving said image data representative of the tubular based structure;

a placing unit operatively coupled to the data receiving unit for placing each of said seeds in each of the corresponding regions;

a processing unit operatively coupled to the placing unit for performing each of said region growings;

a tree building unit operatively coupled to the processing unit for building said tree; and a filtering unit operatively coupled to the tree building unit for filtering said tree according to said predetermined topological parameters to thereby determine said estimation of said topological support of the tubular based structure.

32. The system according to claim 31, further comprising a display unit operatively coupled to the filtering unit for displaying said estimation of said topological support of the tubular based structure.

33. A method of doing business in determining an estimation of a topological support of a tubular based structure according to the method as claimed in claim 1, wherein said estimation of a topological support of a tubular based structure is determined for a fee.

* * * * *